US008654197B2

(12) United States Patent
Nizko et al.

(10) Patent No.: US 8,654,197 B2
(45) Date of Patent: Feb. 18, 2014

(54) SYSTEM AND METHOD FOR OCCUPANCY DETECTION

(75) Inventors: Henry J. Nizko, Merrimack, NH (US); W. Gordon Woodington, Lincoln, MA (US); David V. Manoogian, Lynnfield, MA (US); Mark E. Russell, Westford, MA (US); Maurice J. Toolin, Fitchburg, MA (US); Jonathan H. Walzer, Marshfield, MA (US)

(73) Assignee: Raytheon Company, Waltham, MA (US)

( * ) Notice: Subject to any disclaimer, the term of this patent is extended or adjusted under 35 U.S.C. 154(b) by 684 days.

(21) Appl. No.: 12/397,691

(22) Filed: Mar. 4, 2009

(65) Prior Publication Data

US 2010/0225764 A1    Sep. 9, 2010

(51) Int. Cl.
   *H04N 5/33*    (2006.01)
(52) U.S. Cl.
   USPC ............................................ 348/152; 348/148
(58) Field of Classification Search
   USPC ....................................................... 348/152
   See application file for complete search history.

(56) References Cited

U.S. PATENT DOCUMENTS

| | | | |
|---|---|---|---|
| 4,476,461 A | | 10/1984 | Carubia |
| 4,721,385 A | | 1/1988 | Jelalian et al. |
| 5,197,899 A | * | 3/1993 | Akeda ............................ 439/271 |
| 5,281,949 A | * | 1/1994 | Durley et al. ................. 340/433 |
| 5,416,711 A | * | 5/1995 | Gran et al. .................... 701/117 |
| 5,465,155 A | * | 11/1995 | Edgar ............................ 358/500 |
| 5,801,943 A | * | 9/1998 | Nasburg ........................ 701/117 |
| 5,980,123 A | * | 11/1999 | Heifler .......................... 396/427 |
| 6,085,151 A | * | 7/2000 | Farmer et al. ................. 701/301 |
| 6,111,551 A | * | 8/2000 | Schmidt et al. .............. 343/872 |
| 6,154,133 A | * | 11/2000 | Ross et al. ..................... 340/541 |
| 6,268,803 B1 | | 7/2001 | Gunderson et al. |
| 6,275,180 B1 | * | 8/2001 | Dean et al. ...................... 342/70 |
| 6,304,178 B1 | | 10/2001 | Hayashida |

(Continued)

FOREIGN PATENT DOCUMENTS

| | | |
|---|---|---|
| EP | 1 178 331 A2 | 2/2002 |
| EP | 1 178 331 A3 | 6/2003 |

(Continued)

OTHER PUBLICATIONS

Notification of Transmittal of the International Search Report dated Oct. 15, 2010, PCT/US2010/026135.

(Continued)

*Primary Examiner* — Ario Etienne
*Assistant Examiner* — Blake Rubin
(74) *Attorney, Agent, or Firm* — Daly, Crowley, Mofford & Durkee, LLP

(57) ABSTRACT

A detection system includes a plurality of sensors including an entry sensor having a field of view oriented to detect object entry with respect to an entry portion of an occupancy volume, and an exit sensor having a field of view oriented to detect object exit with respect to an exit portion of the occupancy volume, the exit portion different than the entry portion. The detection system further includes at least one approach sensor having a field of view oriented to detect object approach relative to the entry portion of the occupancy volume, and at least one retreat sensor having a field of view oriented to detect object retreat relative to the exit portion of the occupancy volume.

25 Claims, 18 Drawing Sheets

(56) References Cited

U.S. PATENT DOCUMENTS

| | | | |
|---|---|---|---|
| 6,366,245 B1* | 4/2002 | Schmidt et al. | 343/700 MS |
| 6,417,783 B1* | 7/2002 | Gabler et al. | 340/933 |
| 6,504,479 B1* | 1/2003 | Lemons et al. | 340/541 |
| 6,670,910 B2 | 12/2003 | Delcheccolo et al. | |
| 6,677,889 B2 | 1/2004 | Van Rees et al. | |
| 6,707,414 B2 | 3/2004 | Van Rees et al. | |
| 6,707,488 B1 | 3/2004 | Anuashvili et al. | |
| 6,760,061 B1* | 7/2004 | Glier et al. | 348/149 |
| 6,768,420 B2 | 7/2004 | McCarthy et al. | |
| 6,784,828 B2 | 8/2004 | Delcheccolo et al. | |
| 6,816,107 B2* | 11/2004 | Pleva et al. | 342/74 |
| 6,831,590 B1* | 12/2004 | Steinway et al. | 342/22 |
| 7,170,407 B2 | 1/2007 | Wagner | |
| 7,209,051 B2* | 4/2007 | Shankwitz et al. | 340/938 |
| 7,391,224 B2 | 6/2008 | Wild | |
| 7,411,489 B1 | 8/2008 | Elwell et al. | |
| 7,411,497 B2* | 8/2008 | Kates | 340/556 |
| 7,450,735 B1* | 11/2008 | Shah et al. | 382/103 |
| 7,466,223 B2* | 12/2008 | Sefton | 340/521 |
| 7,542,588 B2* | 6/2009 | Ekin et al. | 382/103 |
| 7,656,430 B2* | 2/2010 | Miyamaki et al. | 348/208.14 |
| 7,710,452 B1* | 5/2010 | Lindberg | 348/149 |
| 7,760,908 B2* | 7/2010 | Curtner et al. | 382/103 |
| 7,764,167 B2* | 7/2010 | Reeves et al. | 340/426.22 |
| 7,902,979 B2* | 3/2011 | Brown | 340/552 |
| 7,944,471 B2* | 5/2011 | Takeda et al. | 348/143 |
| 7,965,313 B2* | 6/2011 | Orias | 348/143 |
| 8,199,009 B2* | 6/2012 | Brunetti | 340/541 |
| 8,218,011 B2* | 7/2012 | Cheng et al. | 348/159 |
| 8,300,102 B2* | 10/2012 | Nam et al. | 348/169 |
| 2002/0067259 A1* | 6/2002 | Fufidio et al. | 340/541 |
| 2002/0145541 A1* | 10/2002 | Matsui et al. | 340/934 |
| 2004/0145499 A1 | 7/2004 | Schmidt et al. | |
| 2004/0252194 A1* | 12/2004 | Lin | 348/169 |
| 2005/0219359 A1* | 10/2005 | Trela | 348/156 |
| 2006/0087439 A1 | 4/2006 | Tolliver | |
| 2006/0140450 A1* | 6/2006 | Hong et al. | 382/107 |
| 2006/0173721 A1* | 8/2006 | Gregg | 705/6 |
| 2006/0250294 A1* | 11/2006 | Zemany et al. | 342/22 |
| 2007/0034235 A1 | 2/2007 | Weyandt et al. | |
| 2007/0097211 A1* | 5/2007 | Washington | 348/135 |
| 2007/0194917 A1* | 8/2007 | Girod et al. | 340/556 |
| 2007/0291118 A1* | 12/2007 | Shu et al. | 348/156 |
| 2008/0018523 A1 | 1/2008 | Kelly, Jr. et al. | |
| 2008/0100706 A1* | 5/2008 | Breed | 348/143 |
| 2008/0165046 A1* | 7/2008 | Fullerton et al. | 342/21 |
| 2008/0270172 A1* | 10/2008 | Luff et al. | 705/1 |
| 2008/0297360 A1* | 12/2008 | Knox et al. | 340/628 |
| 2009/0040307 A1* | 2/2009 | Rubin | 348/153 |
| 2009/0167862 A1* | 7/2009 | Jentoft et al. | 348/143 |
| 2009/0201190 A1* | 8/2009 | Huthoefer et al. | 342/27 |
| 2009/0252196 A1* | 10/2009 | Icove et al. | 374/122 |
| 2010/0079282 A1* | 4/2010 | Icove et al. | 340/561 |
| 2010/0128110 A1* | 5/2010 | Mavromatis | 348/47 |
| 2010/0141527 A1* | 6/2010 | Lalezari | 342/368 |
| 2011/0153545 A1* | 6/2011 | Greene et al. | 706/54 |
| 2011/0164108 A1* | 7/2011 | Bates et al. | 348/36 |

FOREIGN PATENT DOCUMENTS

| | | |
|---|---|---|
| EP | 1 398 647 A2 | 3/2004 |
| EP | 1398647 | 3/2004 |
| EP | 1 398 647 A3 | 4/2004 |
| EP | 1 688 886 A1 | 8/2006 |
| EP | 1688886 A1 | 8/2006 |
| GB | 2 326 530 A | 12/1998 |
| GB | 2326530 A | 12/1998 |
| WO | WO 2006/062517 A1 | 6/2006 |

OTHER PUBLICATIONS

The International Search Report dated Oct. 15, 2010, PCT/US2010/026135.

Written Opinion of the International Searching Authority dated Oct. 15, 2010, PCT/US2010/026135.

PCT/US2010/026135 dated Jun. 29, 2010, Invitation to Pay Additional Fees and, Where Applicable, Protest Fee, 4 pages.

ASIM Technologies, Inc., MW 231, MW 232, Microwave Vehicle Motion Detectors, May 2006, pp. 1-2.

ASIM, Installation Manual TRI-Tech TT 293, TT 295, TT 298, Combination Detectors for Traffic Data Acquisition, Jan. 2007, pp. 1-19.

ASIM, Triple Techonology Detectors TT 290 Series, Apr. 2006, pp. 1-10.

PCT/US2010/026135 dated Sep. 15, 2011, Notification Concerning Transmittal of International Preliminary Report on Patentability (Chapter I of the Patent Cooperation Treaty), 2 pages.

PCT/US2010/026135 dated Sep. 15, 2011, Written Opinion of the International Searching Authority, 9 pages.

EPO Exam Report, Application No. 10 716 651.4-2210, dated Sep. 26, 2012, 4 pages.

Examination Report, European Patent Application No. 10716651.4, dated Apr. 24, 2013, pp. 1-3.

* cited by examiner

SYSTEM AND METHOD FOR OCCUPANCY DETECTION

FIELD OF THE INVENTION

The inventive techniques and systems generally relate to detection of objects of interest within an occupancy zone. In particular, the inventive techniques and systems relate to detection of object entry and exit relative to an occupancy zone, as well as object approach and retreat relative to the occupancy zone.

BACKGROUND

There has been a long felt need for technologies that would prevent terrorism, catch terrorists in the act, and let law-abiding citizens go about their business without the loss of convenience or privacy. The attacks of September 11 have accelerated the search for effective technologies to prevent further attacks using weapons of mass destruction, such as radioactive bombs, and biological agents, such as anthrax. Many public and private organizations and institutions are researching and testing various tools and techniques to meet security and anti-terrorism objectives.

Some of these tools and techniques use artificial intelligence to model and replicate human ability to analyze information, with the hope to automate aspects of detection. Biometrics uses body parts and features to identify and authenticate people. Electromagnetic wave-based technologies use devices such as metal detectors, wave cameras, radio frequency identification tags, and X-rays to detect materials and identify and verify various items. Still other technologies and techniques include forensic analysis, such as DNA sampling and forensic psychology.

As is known in the art, detection systems include video-based solutions that use image processing techniques to detect changes in pixels corresponding to the presence of objects within a video camera's field of view. Other known detection systems include infrared break-beam solutions that require objects to occlude multiple infra-red signals to detect objects within an area of interest.

Radar is a suitable technology for implementing a sensor for use in detection of objects, such as automobiles, trucks, and cargo vessels. One type of radar suitable for this purpose is Frequency-Modulated Continuous-Wave (FMCW) radar. In typical FMCW radar, the frequency of the transmitted CW signal linearly increases from a first predetermined frequency to a second predetermined frequency. FMCW radar has the advantages of high sensitivity, relatively low transmitter power, and good range resolution.

One example FMCW radar solution is the Multi-beam Radar (MBR) from Valeo-Raytheon Systems which in one example configuration is a 24 gigahertz FMCW radar including 7 receive beams and 1 transmit beam. Many of these units are in manufacture and their low cost and good performance make them useful in various applications, such as is in near-object detection systems which may be of the type described in U.S. Pat. No. 6,784,828, entitled "Near Object Detection System," issued Aug. 31, 2004, presently assigned to Raytheon Company of Lexington, Mass.

SUMMARY

In general overview, the inventive systems and techniques can be applied to monitor vehicles or objects that could be used to transport unwanted materials into an area. For example, a detection application that incorporates the inventive techniques and systems can accurately detect and distinguish an object's approach and entry into a portal zone, as well as the object's exit and retreat from the portal zone. Such a detection application can trigger other systems to activate sensors for detecting unwanted transported materials, such as radioactive materials, biological agents, stolen goods, as well as other types of materials.

In an exemplary environment, the inventive techniques and systems are used to detect and identify vehicle and pedestrian traffic passing through a toll booth, for example a toll booth along a public turnpike. Other applications may detect and identify objects of interest as they approach and enter into a border zone from one country to another, a security zone around a protected facility, an entryway into a building, and transportation zones at airports, and other points-of-entry. In another example environment, the inventive techniques and systems detect and identify sea-faring vessels such as cargo ships as they enter commercial seaports for processing. The inventive systems and techniques may be applied to railway systems for identification and verification of individual rail cars, a sequence of rail cars, or to verify that the number of detected rail cars correlates to a documented or expected amount.

The inventive techniques and systems can determine the presence of objects of interest including pedestrians, bicycles, automobile bumpers, glass surfaces, and vehicle wheel frames. Further, the inventive techniques and systems can accurately detect and identify an object of interest made up of multiple sections or compartments, such as a tractor trailer made up of a cabin, a first trailer, and a second trailer attached to the first trailer by a horizontal hitch. The inventive techniques and systems can also accurately identify and distinguish between multiple objects, such as closely-spaced motor vehicles as they approach, enter, exit, and retreat from a portal zone or occupancy area.

In one embodiment, the inventive techniques and systems include an arrangement of sensors to detect object entry and exit from an occupancy zone, as well as object approach and retreat relative to the occupancy zone. The arrangement of sensors may be coupled to a processing system that processes occupancy information to determine whether an object of interest has entered an occupancy zone. The processing system may also determine a speed and direction of an object of interest as it approaches, enters, exits, and/or retreats relative to the occupancy zone. Based upon detection results, the processing system may activate other systems to scan for and prevent unwanted materials from passing though the occupancy zone. For example, the processing system may provide an output signal that represents whether an object is detected or not-detected within the occupancy zone. When the output signal indicates an object is detected, a scan may be initiated to sweep for unwanted materials, such as radioactive materials. If the sweep positively indicates the presence of unwanted materials, security personnel can prevent the object from passing through the occupancy zone.

In other instances, the processing system may provide an output signal indicating whether an object of interest has entered into or exited from the occupancy zone. Still further, the processing system may output a velocity and direction of an object of interest, either as the object of interest approaches the occupancy zone, passes within the occupancy zone, or retreats from the occupancy zone. Such velocity information may be used to determine whether an object of interest has stopped, which can trigger a scan. Further, it may be determined that an object of interest is travelling too fast to enable accurate scanning of unwanted materials, which may trigger an alarm and responses from security personnel.

In one aspect, a detection system includes a plurality of sensors including an entry sensor having a field of view oriented to detect object entry with respect to an entry portion of an occupancy volume, and an exit sensor having a field of view oriented to detect object exit with respect to an exit portion of the occupancy volume, the exit portion different than the entry portion. At least one approach sensor has a field of view oriented to detect object approach relative to the entry portion of the occupancy volume and at least one retreat sensor has a field of view oriented to detect object retreat relative to the exit portion of the occupancy volume.

In further embodiments, the inventive techniques and systems include one or more of the following features: wherein the at least one approach sensor includes a first approach sensor having a first approach field of view oriented with respect to an approach volume adjacent to the entry portion and outside of the occupancy volume, and a second approach sensor having a second approach field of view oriented with respect the approach volume, the second approach field of view at least partially different than the first approach field of view; wherein the first approach field of view is opposed to the second approach field of view to maximize object detection within the approach volume; wherein the at least one retreat sensor includes a first retreat sensor having a first retreat field of view oriented with respect to a retreat volume adjacent to the exit portion and outside of the occupancy volume, and a second retreat sensor having a second retreat field of view oriented with respect the retreat volume, the second retreat field of view at least partially different than the first retreat field of view; wherein the first retreat field of view is opposed to the second retreat field of view to maximize object detection within the retreat volume; wherein at least a portion of the plurality of sensors includes frequency-modulation continuous-wave microwave sensors; and wherein at least one of the entry and exit sensors is a frequency-modulation continuous-wave microwave multi-beam radar sensor mounted within an absorber box to narrow beam spread.

In another aspect, a detection system includes a first sensor having a first field of view oriented to detect object entry with respect to an occupancy volume, a second sensor having a second field of view oriented to detect object exit with respect to the occupancy volume, a third sensor having a third field of view oriented to detect object approach relative to the occupancy volume, and a fourth sensor having a fourth field of view oriented to detect object retreat relative to the occupancy volume.

In further embodiments, the inventive techniques and systems include one or more of the following features: a fifth sensor having a fifth field of view opposed to the third field of view of the third sensor to further detect object approach relative to the occupancy volume, and a sixth sensor having a sixth field of view opposed to the fourth field of view of the fourth sensor to further detect object retreat relative to the occupancy volume; wherein the occupancy volume is defined by an entry portion and an exit portion generally opposed to the entry portion and the first sensor is positioned along the entry portion, the second sensor is positioned along the exit portion, the third and fifth sensors are positioned along the entry portion, and the fourth and sixth sensors are positioned along the exit portion; the third field of view of the third sensor is oriented to detect object approach within an approach volume adjacent to the entry portion and outside of the occupancy volume, and the fifth field of view of the fifth sensor is oriented to detect object approach within the approach volume, the fifth field of view at least partially different than the third field of view, and the forth field of view of the fourth sensor is oriented to detect object retreat within a retreat volume adjacent to the exit portion and outside of the occupancy volume, and the sixth field of view of the sixth sensor is oriented to detect object retreat within the retreat volume, the sixth field of view at least partially different than the forth field of view; the first sensor produces a first break-beam significantly reduced in longitudinal width by the first absorber box to provide object detection coverage across the entry portion of the occupancy volume, and the second sensor produces a second break-beam significantly reduced in width by the second absorber box to provide object detection coverage across the exit portion of the occupancy volume; the first sensor is a multi-beam radar sensor mounted within a first absorber box, and the second sensor is a multi-beam radar sensor mounted within a second absorber box; and the third sensor is a multi-beam radar sensor providing a first elevation of object approach coverage relative to a ground plane of the occupancy volume coincident with ground level and the fourth sensor is a multi-beam radar sensor providing an second elevation of object retreat coverage relative to the ground plane of the occupancy volume.

In still another aspect, a detection system includes a first sensor having a first field of view oriented to detect object entry into a portal zone from a lane entry zone adjacent to the portal zone at an entry portion of the portal zone, a second sensor having a second field of view oriented to detect object exit from the portal zone into a lane exit zone adjacent to the portal zone at an exit portion of the portal zone opposing the entry portion of the portal zone, a third sensor having a third field of view oriented to detect object approach toward the portal zone within the lane entry zone, and a forth sensor having a forth field of view oriented to detect object retreat from the portal zone within the lane exit zone.

In further embodiments, the inventive techniques and systems include one or more of the following features: the portal zone is defined by a first side and a second side laterally opposing the first side, the first and second sides substantially parallel to a direction of object travel, further including a fifth sensor having a fifth field of view oriented to detect object approach toward the portal zone within the lane entry zone and laterally opposing the third field of view; and a sixth sensor having a sixth field of view oriented to detect object retreat from the portal zone within the lane exit zone and laterally opposing the forth field of view, wherein the first, third, and fourth sensors are substantially aligned with the first side and the second, fifth, and sixth sensors are substantially aligned with the second side; a first vertical body positioned along the first side of the portal zone at the entry portion of the portal zone adjacent to the lane entry zone, and a second vertical body positioned along the second side of the portal zone at the exit portion of the portal zone adjacent to the lane exit zone, wherein the first, third, and forth sensors are mounted to the first vertical body and the second, fifth, and sixth sensors are mounted to the second vertical body; wherein the first sensor is mounted within a first absorber box to reduce the longitudinal width of the first field of view, the second sensor is mounted within a second absorber box to reduce the longitudinal width of the second field of view, the third sensor is mounted within a third absorber box to further reduce the third field of view and the fourth sensor is mounted within a fourth absorber box to further reduce the fourth field of view and the fifth sensor is mounted within a fifth absorber box to further reduce the fifth field of view and the sixth sensor is mounted within a sixth absorber box to further reduce the fifth field of view; and the third field of view is further oriented toward ground level at one side of the late entry zone and the fifth field of view is further oriented toward ground level at another side of the late entry zone opposing the one side of the late entry zone, and the forth field of view is further oriented toward ground level at one side of the late exit zone and the sixth field of view is further oriented toward ground level at another side of the late exit zone opposing the one side of the lane exit zone.

The inventive techniques and systems include a calibration and detection method based upon sensing differences in a background field absent an object of interest and the background field having an object of interest. Generally, an occupancy area includes one or more background objects capable of producing background detections in the sensor. The background detections represent a first state of the occupancy area absent an object of interest. However, as an object of interest enters the occupancy area and begins to occlude the one or more background objects from the sensor, the background detections tend to become weakened in detection magnitude. The weakened detections represent a second state of the occupancy area having the object of interest.

In one aspect, a method of occupancy detection includes calibrating a first sensor to provide background detections of a first state of an occupancy volume absent an object of interest and having at least one background object, and detecting a second state of the occupancy volume having the object of interest by identifying background detections weaker than background detections of the first state.

In further embodiments, the inventive methods include one or more of the following features: calibrating a second sensor according a third state of the occupancy volume absent movement of the object of interest, and detecting a fourth state of the occupancy volume having movement of the object of interest by identifying differences in the third state of the occupancy volume and the fourth state of the occupancy volume; wherein detecting the fourth state further includes detecting velocity of the object of interest including obtaining a first detection range and a first detection time associated with the object of interest and a second detection range and a second detection time associated with the object of interest, and calculating a ratio of the difference of the first and second detection ranges over the difference of the first and second detection times; identifying when the object of interest has stopped by identifying when the difference of the first and second detection range is substantially equal to 0 or by identifying when the ratio of the difference of the first and second detection ranges over the first and second detection times is substantially equal to 0; the object of interest includes a first object and a second object and further including detecting the first object and the second object in the occupancy volume by identifying a first plurality of object movement detections associated with movement of the first object and a second plurality of object movement detection associated with movement of the second object; the first sensor and the second sensor are frequency-modulated continuous-wave multibeam radar sensors; the object of interest includes a radar reflective material; the object of interest includes a radar absorptive material; recalibrating the first sensor based upon an updated first state of the occupancy volume; wherein recalibrating is performed after the updated first state of the occupancy volume persists for a predetermined amount of time; narrowing the first sensor's field of view to minimize interference from objects outside a desired detection portion of the occupancy volume, wherein the narrowed field of view accurately detects the at least one background object; and outputting an object detection state including at least one of an object detected state and an object not detected state.

BRIEF DESCRIPTION OF THE DRAWINGS

The foregoing features of this invention, as well as the invention itself, may be more fully understood from the following description of the drawings in which.

DETAILED DESCRIPTION

In general overview, a detection system includes occupancy sensors, each having a field of view oriented to detect object entry and/or exit with respect to an occupancy volume, and surround sensors, each having a field of view oriented to detect object approach and/or retreat relative to the occupancy volume. The occupancy volume may be defined by an outer surface and the occupancy sensors may detect object entry and/or exit along a portion or the entire outer surface. Further, the surround sensors may detect object approach and/or retreat along the portion or the entire outer surface of the occupancy volume.

Figure 1:
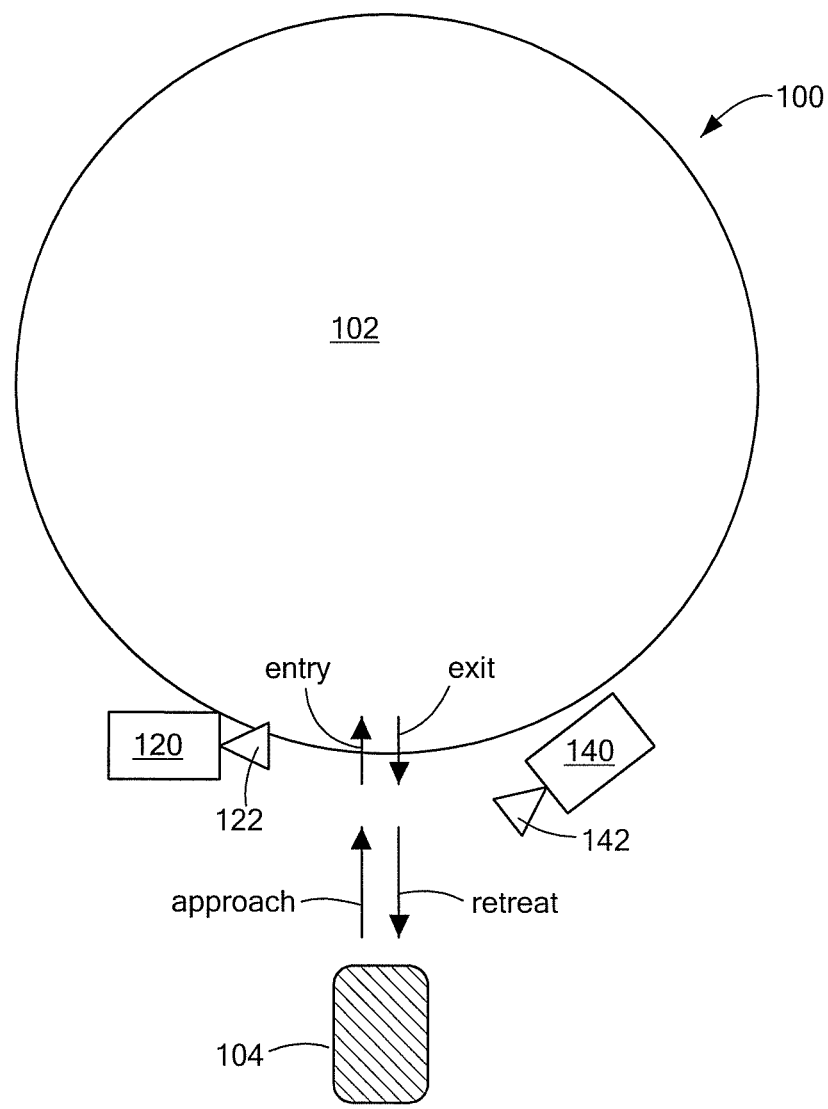
FIG. 1 is a pictorial representation of an embodiment of a detection system in accordance with the techniques and systems described herein.

Referring to FIG. 1, a system 100 includes an occupancy sensor 120 having a field of view 122 oriented to detect at least one of an object of interest's 104 entry and exit with respect to an occupancy volume 102. Further, a surround sensor 140 has a field of view 142 oriented to detect at least one of the object of interest's 104 approach and retreat with respect to the occupancy volume 102.

The sensors 120, 140 may include various types of known sensors. For example, the sensors 120, 140 may include frequency-modulation continuous-wave devices, audio-video devices, heat-sensing devices, or combinations thereof.

The occupancy volume 102 defines a three-dimensional zone of interest within which occupancy information is desired. FIG. 1 depicts a generally circular occupancy volume (in top view); however, the occupancy volume may define any appropriate space within which occupancy information is desired. For example, it will be understood that an occupancy volume may include a box-shaped volume with a width, depth, and height relative to a ground surface, such as a road, water surface, structure floor, wall, or ceiling, etc. Further, the occupancy volume may include a more complex volume, such as an area surrounding a building or city block, defined by multiple smaller areas. The areas need not necessarily be continuous or touch each other, for example, the occupancy volume may include disjointed entryway areas around a building's perimeter.

Figure 2:
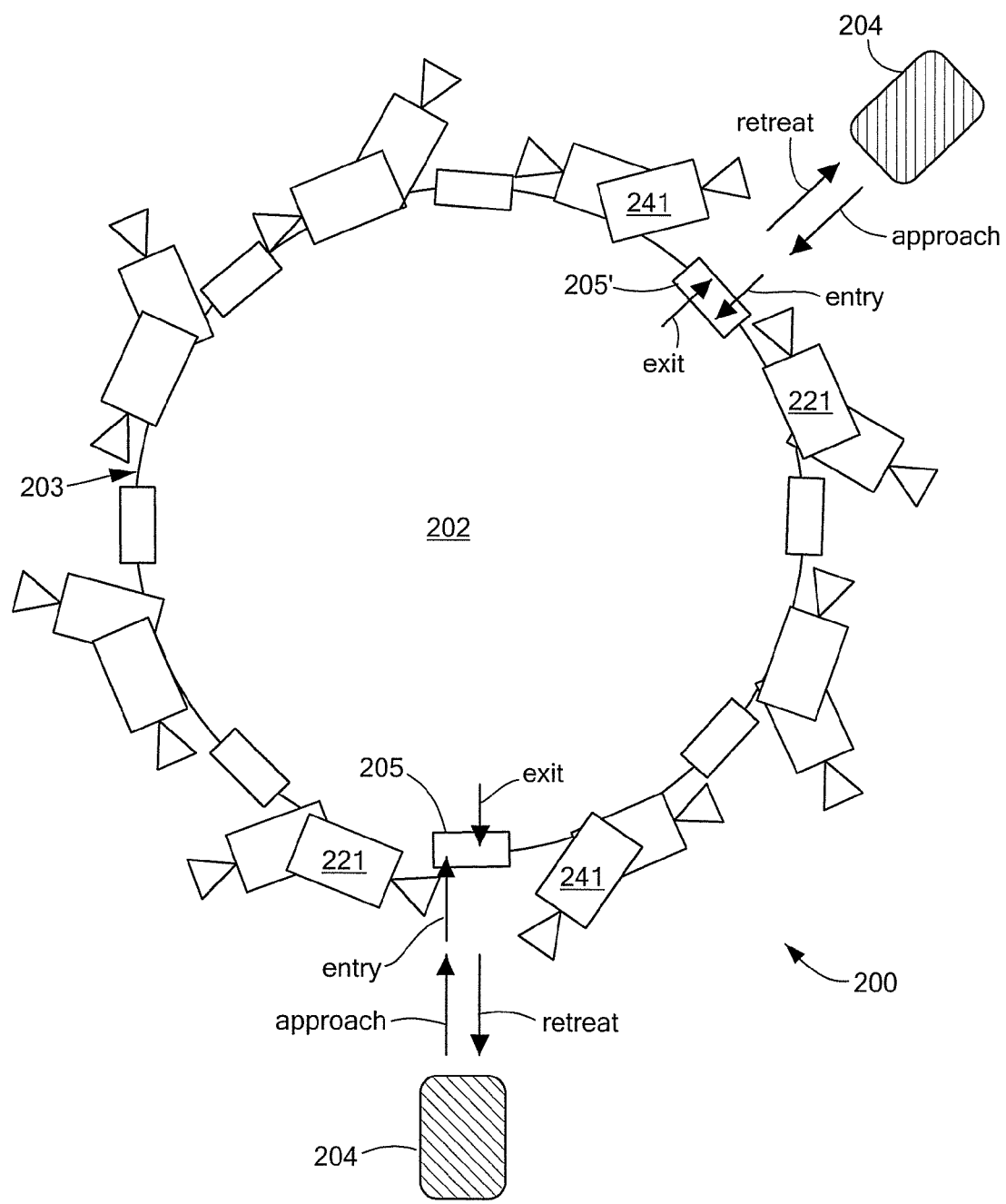
FIG. 2 is a pictorial representation of another embodiment of a detection system in accordance with the techniques and systems described herein.

Referring now to FIG. 2, in a further embodiment of the inventive systems and techniques, a system 200 includes a plurality of occupancy sensors 221, each having a field of view to detect an object of interest's 204 entry and/or exit along a portion 205 of an outer surface 203 of an occupancy volume 202 here shown as a circular area. Further, system 200 includes a plurality of surround sensors 241, each having a field of view to detect an object of interest's 204 approach and/or retreat with respect to the occupancy volume 202.

As can be seen in FIG. 2, the occupancy and surround sensors 221, 241 may cover a portion of the outer surface 203, or, in combination, substantially all of the outer surface 203 of the occupancy volume 202. In still other embodiments, the occupancy and surround sensors 221, 241 may cover high interest portions along the outer surface 203. For example, a first set of sensors may cover a first portion 205 representing a first entryway into the occupancy volume 202, and a second set of sensors may cover a second portion 205' representing a second entryway into the occupancy volume 202. The various portions may be similarly shaped, for example, the size and shape of a standard entryway into a building, or they may be different. For example, one portion may cover a large cargo vehicle entryway, and another portion may cover a small package delivery entryway.

Figure 3:
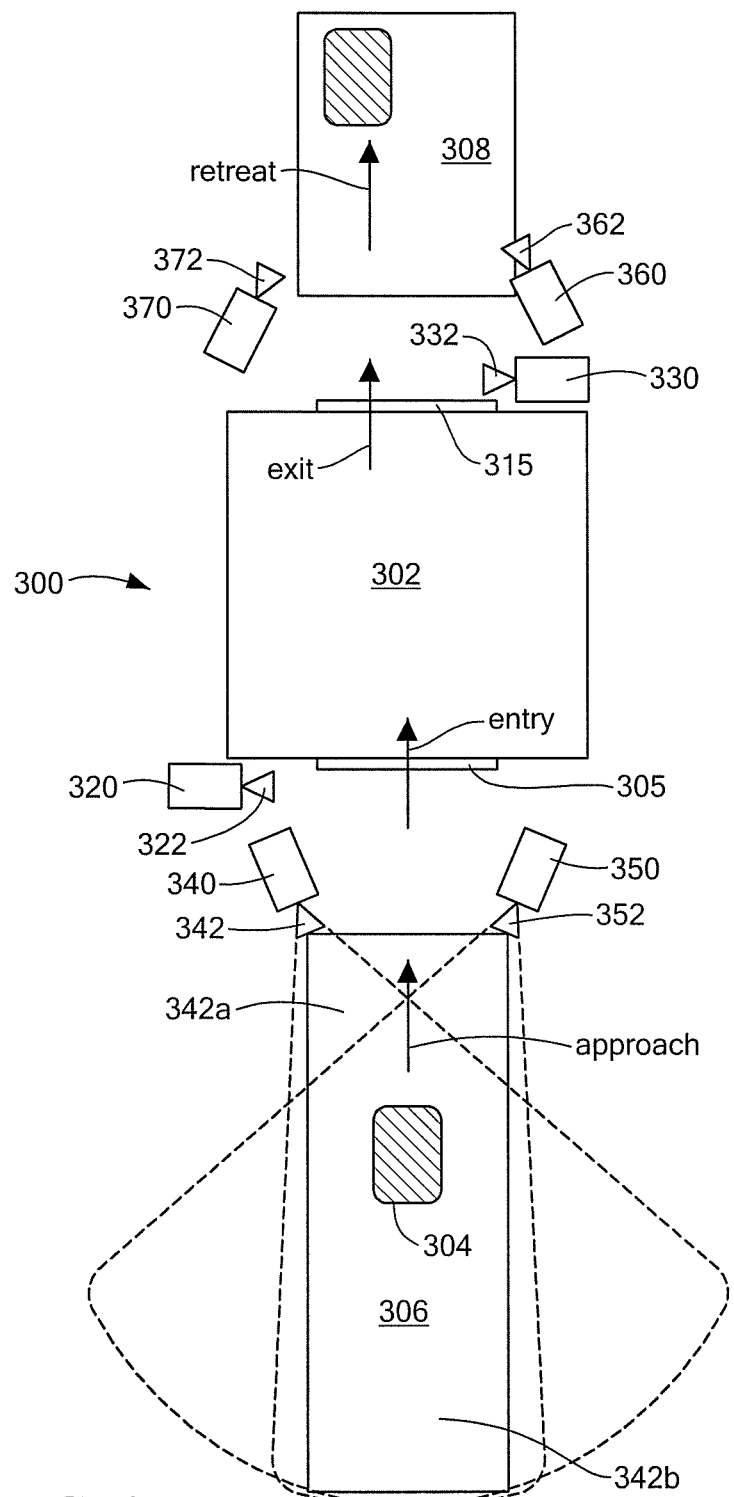
FIG. 3 is a pictorial representation of still another embodiment of a detection system in accordance with the techniques and systems described herein.

Referring now to FIG. 3, in a further embodiment of the inventive systems and techniques, a system 300 includes a plurality of sensors (an example one of the plurality of sensors is designated by reference number 320) including an entry sensor 320 having a field of view 322 oriented to detect an object of interest's 304 entry with respect to an entry portion 305 of an occupancy volume 302, and an exit sensor 330 having a field of view 332 oriented to detect the object of interest's 304 exit with respect to an exit portion 315 of the occupancy volume 302. The exit portion 315 is different than the entry portion 305. For example, as shown in FIG. 3, the exit portion 315 may generally oppose the entry portion 305 of the occupancy volume 302. It will be understood, however, that the entry and exit portions 305, 315 may partially overlap. For example, an object of interest may enter through a gate into the occupancy volume, and then may exit through the same gate of the occupancy volume.

System 300 further includes an approach sensor 340 having a field of view 342 oriented to detect object approach relative to the entry portion 305 of the occupancy volume 302, and a retreat sensor 360 having a field of view 362 oriented to detect object retreat relative to the exit portion 315 of the occupancy volume 302.

In an example application incorporating the system 300, the occupancy volume 302 is a security check point area of an international border between two countries. An object of interest 304 must pass through the security check point (i.e., to pass from one country to the other country) where it is searched for (for example) unwanted, dangerous, or criminal goods. The entry sensor 320 detects the object of interest 304 as it passes through the entry portion 305 of the security checkpoint. This alerts a scanner which scans the object of interest 304 to detect, for example, radioactive materials, biological agents, stolen property, suspects, etc. Based upon the scan results, the security personnel may allow the object of interest 304 to pass through the checkpoint, and the exit sensor 330 detects the object of interest 304 as it passes through the exit portion 315 of the security checkpoint. This may further alert the scanner to reset and prepare a scan for the next object of interest.

In the above example application, the approach sensor 340 detects the object of interest 304 as it approaches the security check point. This may help alert security personnel to an approaching object to provide safeguards. For example, if the object of interest 304 is approaching the security check point at a dangerous or unwanted velocity, or is stopped in front of the security check point and blocking traffic, an alarm may sound to alert security personnel to respond appropriately.

The retreat sensor 360 detects the object of interest 304 as it retreats from the security check point. This may help security personnel determine that the object of interest 304 has safely exited the scene and to attend to another object of interest, if any, approaching the security check point.

The sensors 320, 330, 340, 360 have respective fields of view 322, 332, 342, 362 oriented to appropriately detect respective entry, exit, approach, and retreat of the object of interest 304. A sensor's field of view represents an area that the sensor can accurately and reliably detect the object of interest 304. Although not part of the system 300, the object of interest 304 may be most any object based upon the application. For example, in some application environments, such as the above described security check point, or a toll booth facility, an object of interest may be an automobile, truck, motorbike, or other types of vehicles found on public turnpikes. In other application environments, the object of interest may be a container ship carrying cargo. In still other application environments, the object of interest may be a bicycle, pedestrian, package, animal, etc.

The sensors 320, 330, 340, 360 may be designed to accurately and reliably detect an object of interest 304 based upon the expected environmental conditions and/or nature of the application. For example, the sensors 320, 330, 340, 360 may need to operate in heavy rain, extreme temperatures (i.e., extreme hot and/or cold temperatures), and/or lighting conditions (i.e., bright sun light and/or complete darkness), and other environmental conditions such as snow, hail, fog, etc. Further, the sensors 320, 330, 340, 360 may need to detect various sizes and shapes of objects, as well as objects with various surface properties. For example, the sensors may need to detect physically large objects ranging from highly reflective to highly absorptive surface properties and/or physically small objects ranging from highly reflective to highly absorptive surface properties.

Referring again to FIG. 3, in a further embodiment the system 300 includes a first approach sensor 340 having a first approach field of view 342 oriented with respect to an approach volume 306 adjacent to the entry portion 305 and outside of the occupancy volume 302, and a second approach sensor 350 having a second approach field of view 352 oriented with respect the approach volume 306. The second approach field of view 352 is at least partially different than the first approach field of view 342. For example, as shown by the dotted line areas representing respective first and second approach fields of view 342, 352, at least a portion of the fields of view are different. For example, portion 342a of first approach field of view 342 does not include second approach field of view 352. Furthermore, portion 342b of the first approach field of view 342 overlaps with the second approach field of view 352.

Advantageously, such an arrangement of approach sensors 340, 350 can provide a highly effective coverage of the approach volume 306. This helps prevent the object of interest 304 from slipping past the approach sensors 340, 350 to avoid detection. Furthermore, the first and second approach fields of view 342, 352 overlap where the object of interest is most likely to be found, which increases accuracy and reliability of the system 300.

The approach volume 306 is adjacent to and outside of the occupancy volume 302. The approach volume 306 may touch the occupancy volume 302, for example, along the entry portion 305. It will be understood, however, that approach volume 306 may be located at some distance from the occupancy volume 302; for example, a transition zone may intervene between the approach volume 306 and the occupancy volume 302. Furthermore, the approach volume 306 may be any size in relation to the occupancy volume 302. For example, the approach volume 306 of the above described security check point application may extend along an access road for 20 feet, 50 feet, 100 yards, etc., based upon the application environment.

The system 300 may further include a first retreat sensor 360 having a first retreat field of view 362 oriented with respect to a retreat volume 308 adjacent to the exit portion 315 and outside of the occupancy volume 302, and a second retreat sensor 370 having a second retreat field of view 372 oriented with respect the retreat volume 308. Furthermore, the second retreat field of view 372 is at least partially different than the first retreat field of view 362. For example, the first retreat field 362 may be opposed to the second retreat field of view 372 to provide highly effective coverage of the retreat volume 308, and to increase detection accuracy and reliability of the system 300.

The retreat volume 308 is adjacent to and outside of the occupancy volume 302. The retreat volume 308 may touch the occupancy volume 302, for example, along the exit portion 315. It will be understood, however, that retreat volume 308 may be located at some distance from the occupancy volume 302; for example, a transition zone may intervene between the retreat volume 308 and the occupancy volume 302. Furthermore, the retreat volume 308 may be any size in relation to the occupancy volume 302. For example, the retreat volume 308 of the above described security check point application may extend along an exit road for 20 feet, 50 feet, 100 yards, etc., based upon the needs of the application environment.

The approach and retreat volume 306, 308 may at least partially overlap, or they may be opposed to each other with respect to the occupancy volume 302, as illustrated in the arrangement of the entry and exit portions 305, 315 of FIG. 3.

It will be understood that the detection system is not limited to the approach and retreat sensors being positioned on respective entry and exit portions of the occupancy. For example, in another embodiment, the approach and retreat sensor may be positioned within the occupancy volume and may oppose each other on opposite sides of the occupancy volume.

Figure 4:
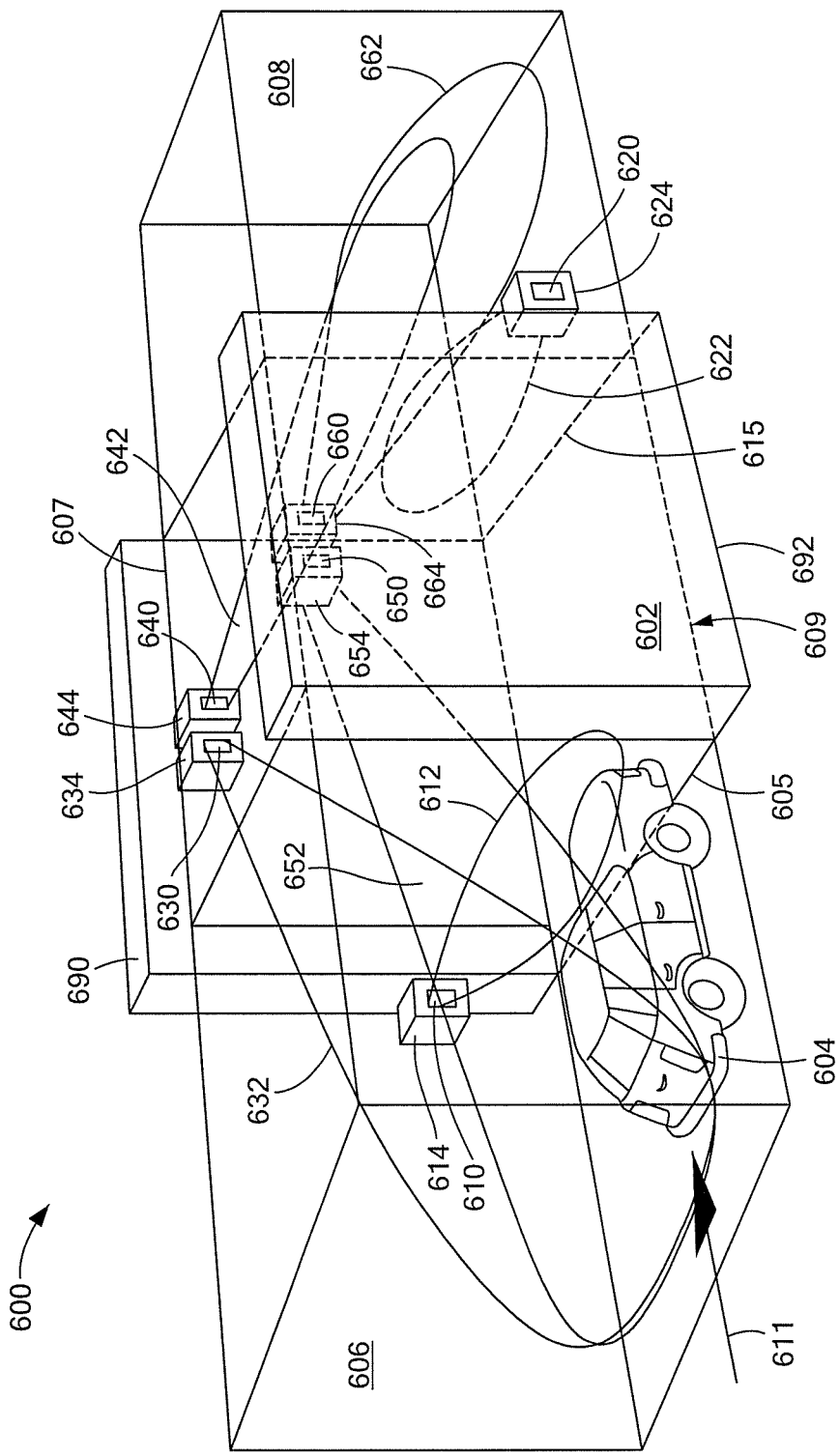
FIG. 4 is a pictorial representation of yet another embodiment of a detection system in accordance with the techniques and systems described herein.

Referring now to FIG. 4, in one aspect, a detection system 600 includes a first sensor 610 having a first field of view 612 oriented to detect an object of interest's 604 entry into a portal zone 602 from a lane entry zone 606 adjacent to the portal zone 602 at an entry portion 605 of the portal zone 602, a second sensor 620 having a second field of view 622 oriented to detect the object of interest's 604 exit from the portal zone 602 into a lane exit zone 608 adjacent to the portal zone 602 at an exit portion 615 of the portal zone 602 opposing the entry portion 605 of the portal zone 602. Further, the system 600 includes a third sensor 630 having a third field of view 632 oriented to detect the object of interest's 604 approach toward the portal zone 602 within the lane entry zone 606, and a forth sensor 640 having a forth field of view 642 oriented to detect the object of interest's 604 retreat from the portal zone 602 within the lane exit zone 608.

Referring again to FIG. 4, the portal zone 602 may be defined by a first side 607 and a second side 609 laterally opposing the first side 607 and substantially parallel to a direction of object travel 611. The portal zone 602 may also include a fifth sensor 650 having a fifth field of view 652 oriented to detect the object of interest's 604 approach toward the portal zone 602 within the lane entry zone 606, and a sixth sensor 660 having a sixth field of view 662 oriented to detect the object of interest's 604 retreat from the portal zone 602 within the lane exit zone 608.

Additionally, the fifth field of view 652 laterally opposes the third field of view 632 and the sixth field of view 662 laterally opposes the forth field of view 642. Additionally, the first, third, and fourth sensors 610, 630, 640 are substantially aligned with the first side 607 of the portal zone 602, and the second, fifth, and sixth sensors 620, 650, 660 are substantially aligned with the second side 609 of the portal zone 602.

Referring again to FIG. 4, the system 600 may further include a first vertical body 690 positioned along the first side 607 of the portal zone 602 and a second vertical body 692 positioned along the second side 609 of the portal zone 602.

In this embodiment, the first, third, and forth sensors 610, 630, 640 are mounted to the first vertical body 690 and the second, fifth, and sixth sensors 620, 650, 660 are mounted to the second vertical body 692. The first vertical body 690 is aligned with the first side 607 of the portal zone 602, and the second vertical body 692 is aligned with the second side 609 of the portal zone 602, such that the first and second vertical bodies are laterally opposed to each other.

In one embodiment, the first and second vertical bodies 690, 692 extend from the lane entry zone 606 to the lane exit zone 608. Further, the third and fourth sensors 630, 640 are positioned substantially midway between the lane entry zone 606 and lane exit zone 608, and the fifth and sixth sensors 650, 660 are also positioned substantially midway between the lane entry zone 606 and lane exit zone 608 and opposing the third and fourths 630, 640.

The sensors may be mounted to the vertical bodies in any number of ways, for example, using solder, epoxy, rivets, screws, etc.

In a further embodiment, the first sensor 610 is mounted a distance above a ground surface and the third and forth sensors 630, 640 are mounted another distance above the ground surface which may be higher, lower, or the same as the first sensor 610 distance depending on the needs and characteristics application environment. Still further, the second sensor 620 is mounted a distance above a ground surface and the fifth and sixth sensors 650, 660 are mounted another distance above the ground surface which may be higher, lower, or the same as the second sensor 620 distance depending on the needs and characteristics application environment.

The exact height the sensors is not important, as long as the sensors can detect the expected vertical extents of objects in the application environment so that objects cannot slip through the occupancy area undetected. For example, the objects may be only a few inches off the ground, such as a truck hitch, or very high off the ground, such as an airplane after take off.

The first sensor 610 is may be mounted within a first absorber box 614 and the second sensor 620 may be mounted in a second absorber box 624. Further, the third sensor 630 is mounted within a third absorber box 634, the fourth sensor 640 is mounted within a fourth absorber box 644, the fifth sensor 650 is mounted within a fifth absorber box 654, and the sixth sensor 660 is mounted within a sixth absorber box 664. The absorber boxes 614, 624, 634, 644, 654, and 664 are designed to reduce the extents of the respective sensors' fields of view as will be explained in more detail below.

In another embodiment, the third and fourth sensors 630, 640 may be mounted within a single absorber box and the fifth and sixth sensors 650, 660 may be mounted within another single absorber box.

Figure 5:
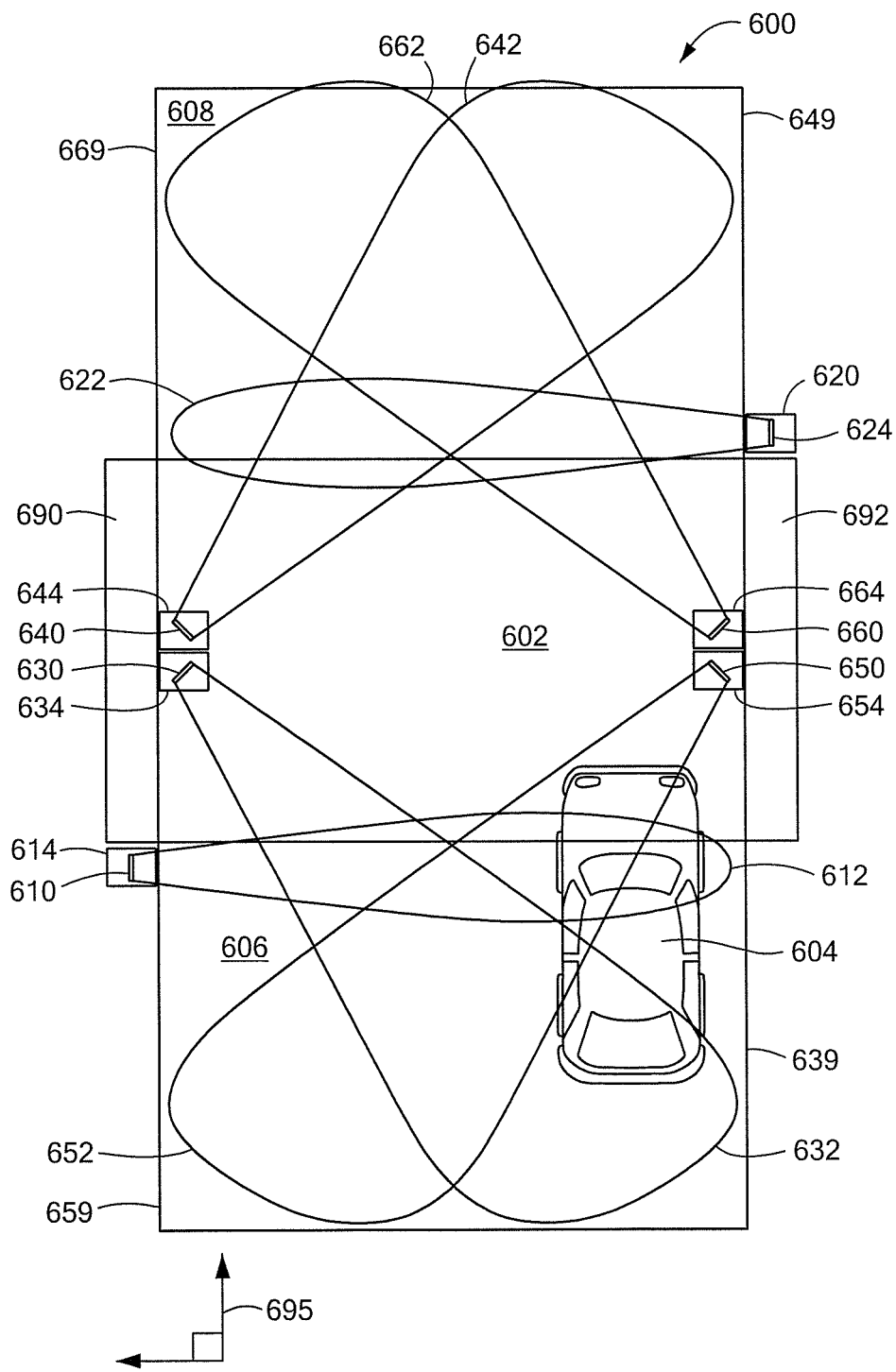
FIG. 5 is a top view of the detection system embodiment of FIG. 4.
Figure 6:
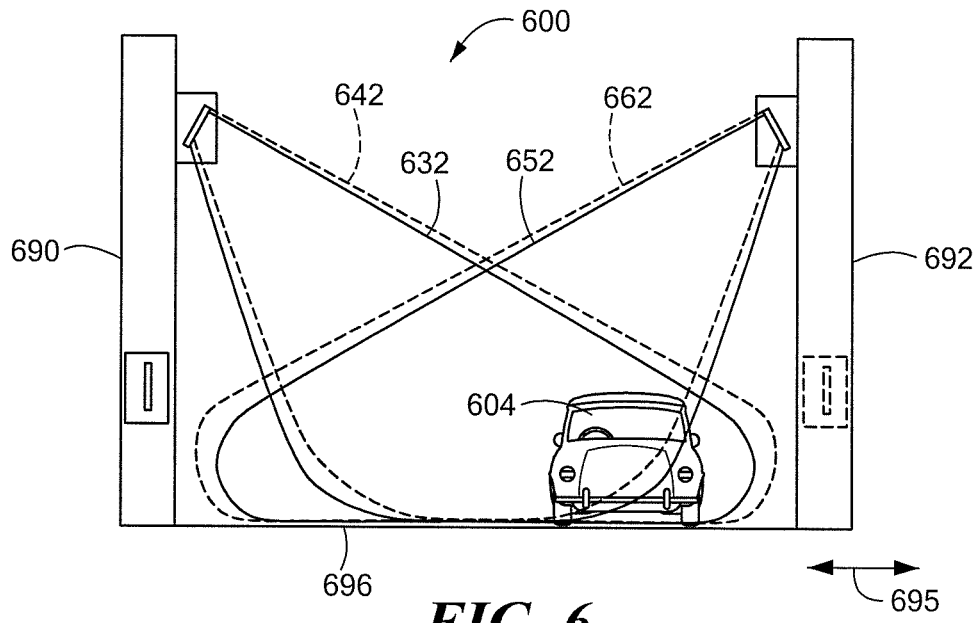
FIG. 6 is a side view of the detection system embodiment of FIG. 4.

Referring now to FIGS. 5 and 6 showing respective top and front views of a further embodiment of system 600, and in which like elements of FIG. 4 are shown with like reference designations, the third field of view 632 of third sensor 630 is further oriented toward ground level 696 (FIG. 6) defined in ground plane 695 and at one side 639 of the late entry zone 606, and the fifth field of view 652 of the fifth sensor 650 is further oriented toward the ground level 696 and at another side 659 of the late entry zone 606 opposing the one side 639 of the late entry zone 606. Further, the fourth field of view 642 of fourth sensor 640 is further oriented toward ground level 696 and at one side 649 of the late exit zone 608 and the sixth field of view 662 of sixth sensor 660 is further oriented toward ground level 696 and at another side 669 of the late exit zone 608 opposing the one side 649 of the lane exit zone 608.

In still a further embodiment, first and second fields of view 612, 622 of respective sensors 610, 620 may further extend horizontally with respect to ground plane 695 to form a combined gap-less coverage area that substantially fills the portal zone 602.

Figure 7:
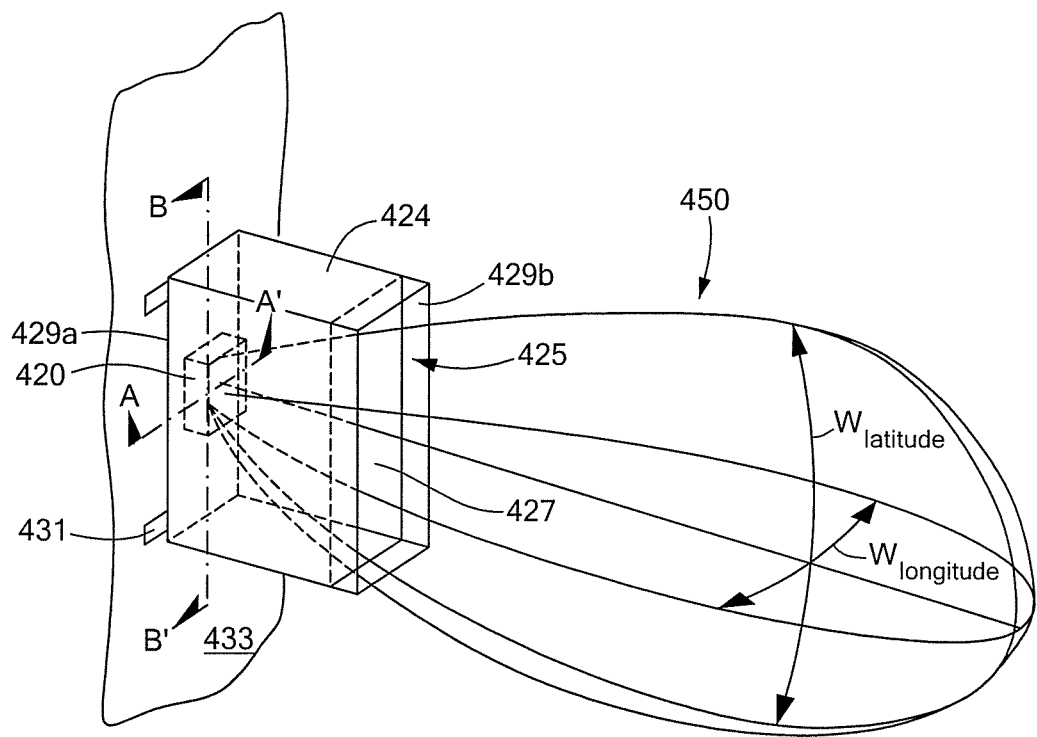
FIG. 7 is a pictorial representation of an absorber box of the type which may be used with the systems and techniques described herein.

Referring now to FIG. 7, in one embodiment, the inventive systems and techniques include a multi-beam radar (MBR) sensor 420 mounted in an absorber box 424. Although the MBR sensor 420 may include a variety of application-specific properties, the MBR sensor 420 may be a 24 GHz frequency-modulated continuous-wave (FMCW) sensor that transmits one beam and receives multiple break-beams. The interior walls 425 of the absorber box 424 may be coated with microwave absorbing material such as any material that can provide sufficient absorption over the expected operating frequency range The result is a reduced beam 450 characterized by a latitudinal width $\omega_{latitude}$ and a longitudinal width $\omega_{longitude}$.

The sensor 420 may be mounted on one side 429a of the absorber box 424 opposing and facing an opening 429b of the absorber box 424. Optionally, the absorber box 424 includes a protective face plate 427 and weather tight seals to prevent water and environmental debris from entering. The absorber box 424 may be mounted to other structures 433 and oriented and positioned so that the MBR sensor can optimally detect various portions of an occupancy zone, such as an entry or exit portion of an occupancy zone. For example, the absorber box may include brackets 431 for mounting to a vertical body 433, similar to the vertical bodies described in conjunction with FIG. 4.

The systems and techniques described herein may include various types of absorber boxes to control break-beam direction and/or reduce unwanted break-beam response. For example, a first type of absorber box may be configured to favor break-beam response substantially orthogonal to a direction of vehicular travel, such as vehicular travel across entry and exit portions of portal zone similar to the portal zone described in conjunction with FIG. 4. In particular, these absorber boxes may be elongated in one or more directions to produce proportionally elongated break-beam patterns.

Still further, a second type of absorber box may be configured to block unwanted break-beam responses outside an area of interest, such as areas outside of a lane entry zone, lane exit zone, and portal zones similar to those described in conjunction with FIG. 4.

Figure 8:
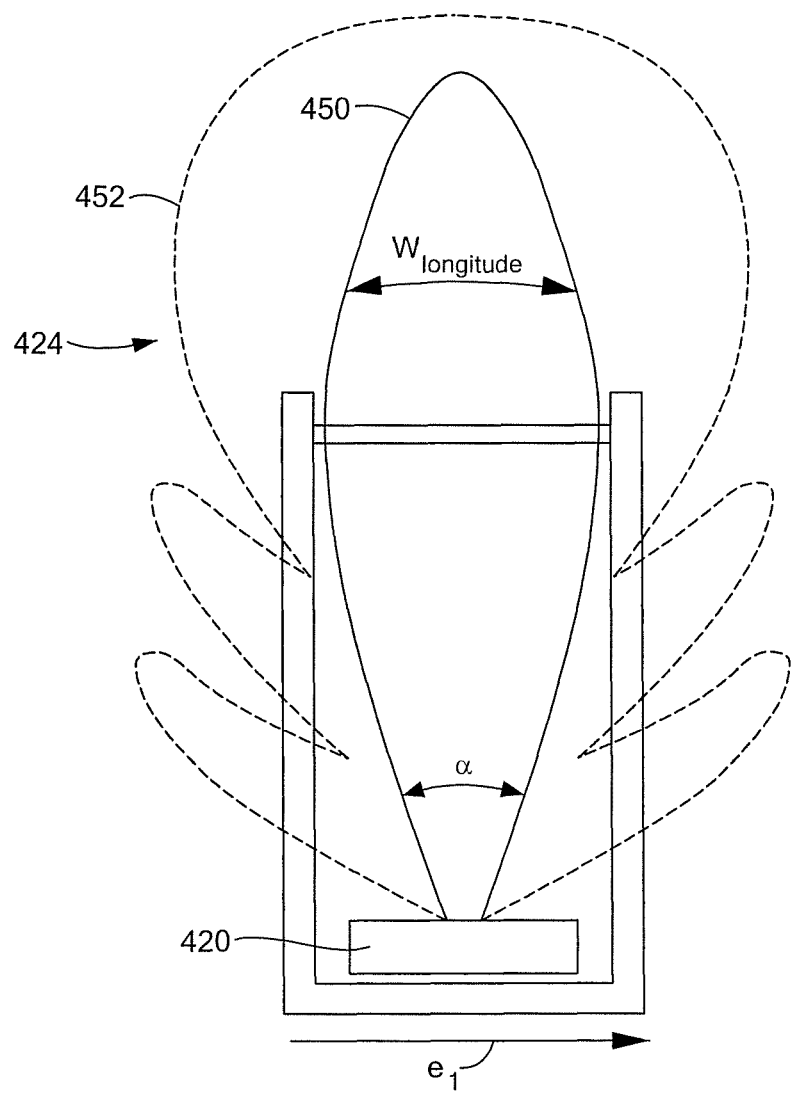
FIG. 8 is a top view of the absorber box embodiment of FIG. 7.
Figure 9:
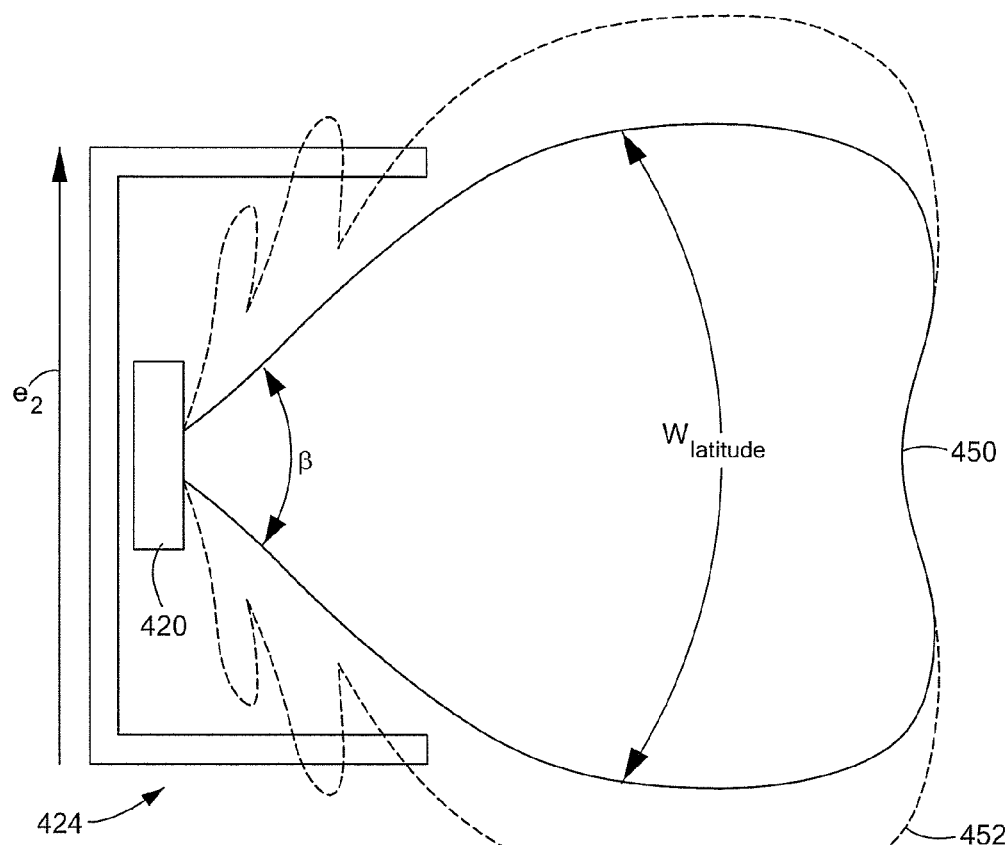
FIG. 9 is a side view of the absorber box embodiment of FIG. 7.

In a further embodiment, an absorber box reduces the field of view of a break-beam of a sensor. Referring now to FIGS. 8 and 9, in which like elements of FIG. 7 are shown with like reference designations, FIG. 8 including a top view of FIG. 7 at line AA', and FIG. 9 including a side view of FIG. 7 at line BB', absorber box 424 may reduce break-beam spread of break-beam 452 (shown in phantom) of MBR sensor 420. Such break-beam reduction may be primarily in one direction, for example, in the latitudinal or longitudinal direction. Absorber box 424 has a longitudinal extent equal to $e_1$ and a latitudinal extent equal to $e_2$. In this example, $e_1$ is smaller than $e_2$, resulting in break-beam 450 significantly narrowed in the longitudinal direction, but relatively unaffected in the latitudinal direction.

As can be seen in FIGS. 8 and 9 (and again in FIG. 7), absorber box 424 results in a reduced break-beam 450 characterized by longitudinal angle α and longitudinal width $\omega_{longitude}$, and latitudinal angle β and latitudinal width $\omega_{latitude}$. Such a configuration may be useful for detecting objects that may cross into an area. For example, referring back to system 600 of FIGS. 4, 5, and 6, absorber boxes 614, 624 may reduce the longitudinal break-beam spread of respective sensors 610, 620 to focus on objects that traverse respective entry and exit portions 605, 615 of portal zone 602.

In yet another embodiment, an MBR sensor capable of producing multiple break-beams, such as seven break-beams, produces a single break-beam for detection. Such an MBR sensor is useful for producing a field of view of a sensor for use with system 600 of FIG. 4

In a further embodiment, a sensor produces a break-beam that is sufficiently narrow enough to avoid interference from detections of objects outside the desired detection area, yet wide enough to detect background objects needed to serve as background reference information.

Figure 10:
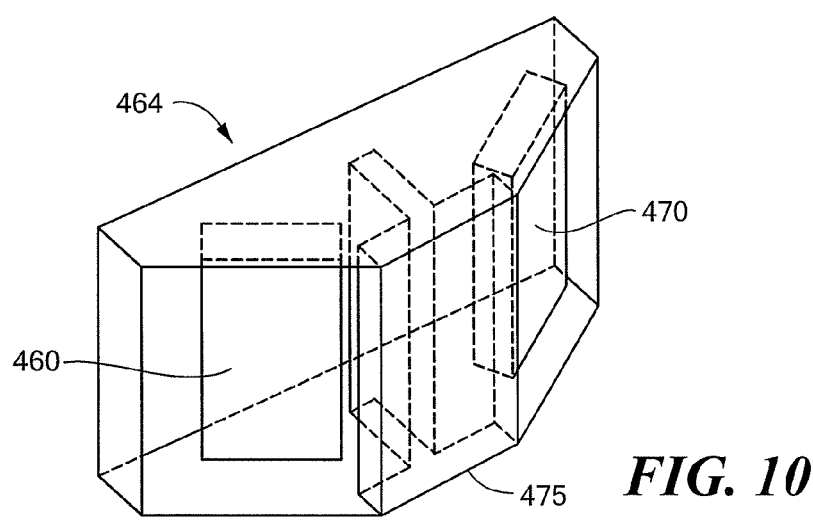
FIG. 10 is a pictorial representation of another absorber box of the type which may be used with the systems and techniques described herein.
Figure 11:
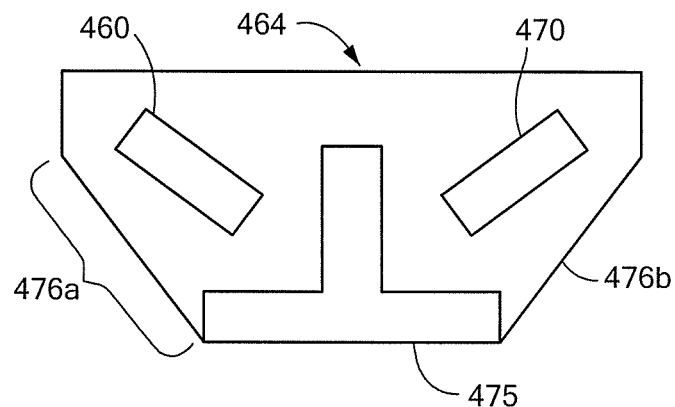
FIG. 11 is a top view of the absorber box embodiment of FIG. 10.

Referring to FIGS. 10 and 11 showing respective perspective and top views of an absorber box/sensor combination, an absorber box 464 is configured to block unwanted break-beam responses and to fan sensor break-beams across different detection areas. Absorber box 464 may be configured to hold a first MBR sensor 460 and a second MBR sensor 470 of the type described above. Each of the sensors 460, 470 may be laterally opposed to each other and oriented to produce break-beams capable of detecting objects within different zones of interest. First MBR sensor 460 is oriented toward a first open face 476a to transmit and receive break-beams, and second MBR sensor 470 is oriented toward a second open fact 476b to transmit and receive break-beams. Further, a microwave absorber 475 disposed between the two sensors 460, 470 can absorb and/or block unwanted break-beam responses.

Such an arrangement can be used in a detection system of the type described in conjunction with FIG. 4. For example, using this arrangement, third and fourth sensors 630, 640 can be mounted in absorber box 634 to detect an object of interest 604 in respective lane entry zone 606 and lane exit zone 608. Furthermore, fifth and sixth sensors 650, 660 can be mounted in absorber 654 to detect an object of interest 604 in respective lane entry zone 606 and lane exit zone 608.

Figure 12:
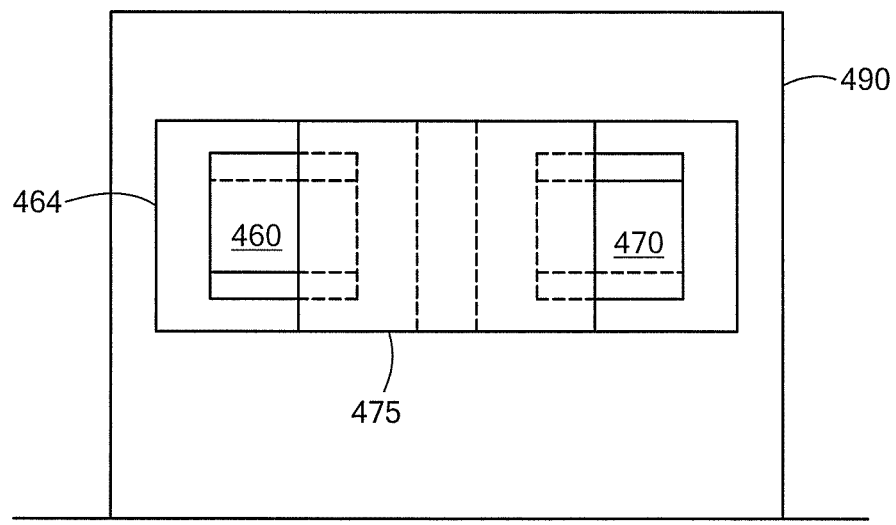
FIG. 12 is a side view of the absorber box embodiment of FIG. 10.

Referring now to FIG. 12, showing a front view of the absorber box arrangement of FIG. 10 and in which like elements of FIG. 10 are shown with like reference numerals, in still a further embodiment, the absorber box 464 is mounted on a vertical body 490 above a ground plane 495. The first MBR sensor 460 is oriented towards the ground plane 495, and the second MBR sensor 470 is oriented away from the ground plane 495. For example, the first MBR sensor 460 may be tilted upward at about a 5 degree angle, and the second MBR sensor 470 may be titled downward at about a 5 degree angle. Such an arrangement is useful for fine-tuning respective near and far fields of view of the sensors 460, 470. For example, the second MBR sensor's 470 field of view will be generally oriented farther afield than the first MBR sensor's 460 field of view.

Figure 13A:
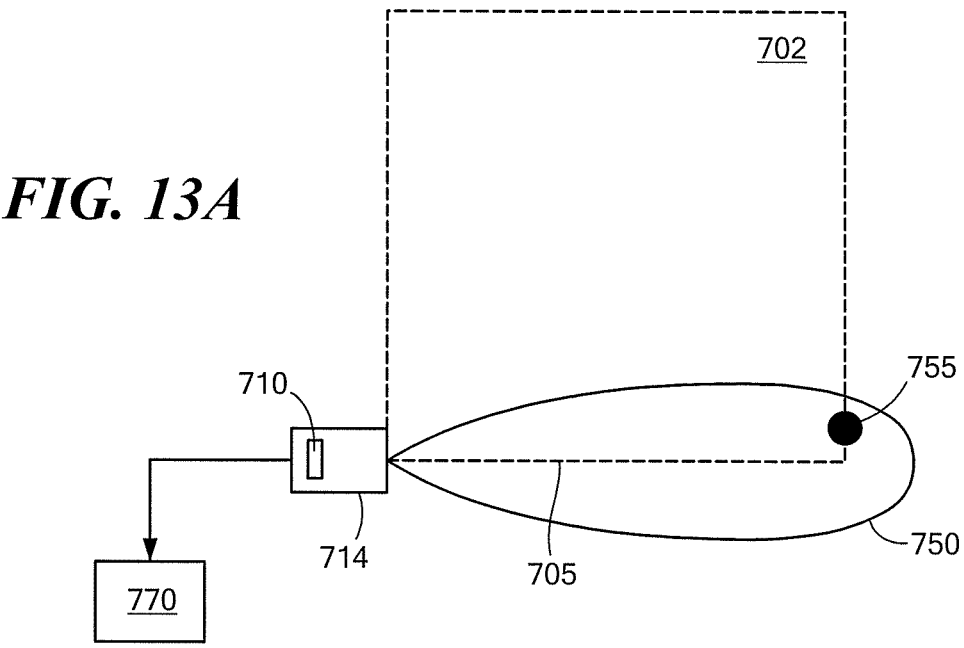
FIGS. 13A and 13B are pictorial representations of calibration of a sensor and detection of an object of interest, respectively, in accordance with a first state and a second state of an occupancy volume.
Figure 13B:
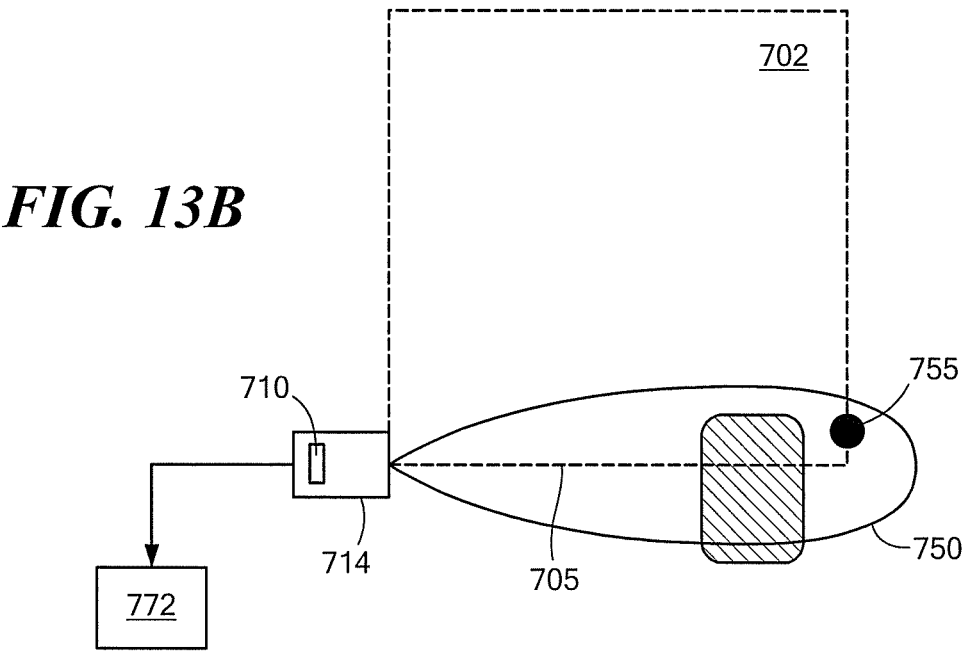

Referring now to FIG. 13A, in one aspect the inventive systems and techniques include a method of occupancy detection including calibrating a first sensor 710, as may be like sensor 610 or 620 of detection system 600 of FIG. 4, to provide background detections 770 of a first state of an occupancy volume 702 absent an object of interest and having a background object 755. Referring now to FIG. 13B, in which like elements of FIG. 13A are show with like reference designations, the method includes detecting a second state of the occupancy volume 702 having the object of interest 704 by identifying background detections 772 weaker than background detections 770 of the first state.

As can be seen in FIGS. 13A and 13B, sensor 710 may be positioned to detect differences in background detections as the object of interest 704 crosses into the occupancy volume 702 via an entry portion 705 and at least partially occludes the background object 755, producing background detections 772 weaker in magnitude than a reference background. It will be understood that sensor 710 may be positioned to detect differences in background detections as the object of interest 704 enters, exits, and/or retreats from the occupancy volume 702. As can further be seen in FIGS. 13A and 13B, sensor 710 may have a field of view that substantially traverses a desired detection area, such as the entry portion 705 of the occupancy volume 702. Furthermore, the background object 755 may be positioned on an opposing side of the occupancy volume 702 so that as the object of interest traverses the entry portion 705 of the occupancy volume 702, it occludes the background object 755, resulting in weaker background detections.

Further, the sensor 710 may be an MBR sensor producing a break-beam 750 narrowed by an absorber box 714, as may be similar to MBR sensor 420 producing break-beam 450 narrowed by absorber box 424 of FIG. 7.

Figure 14A:
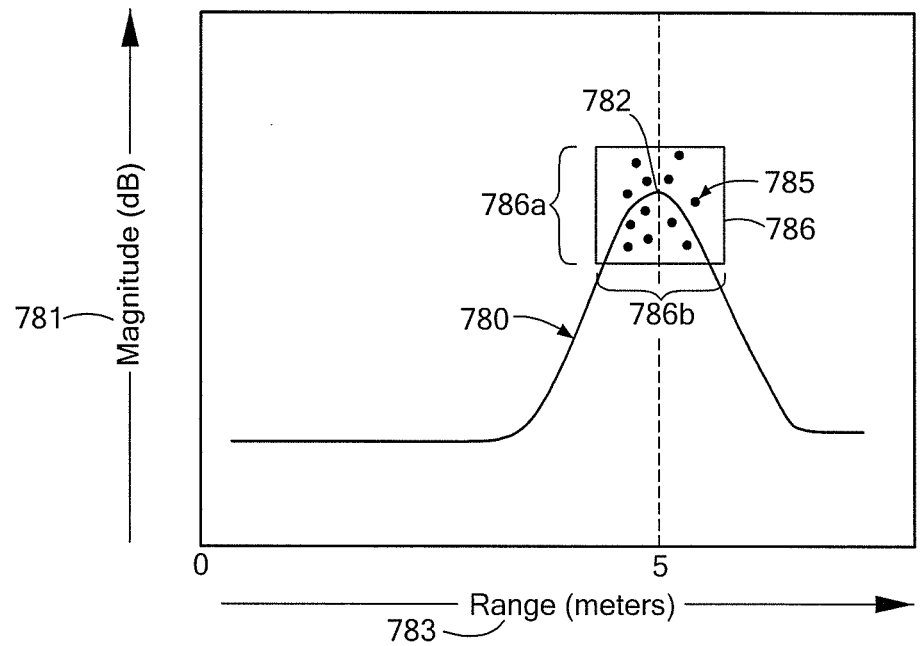
FIGS. 14A and 14B show illustrative background detections of a first state of an occupancy volume and background detections of a second state of an occupancy volume, respectively, in accordance with the techniques and systems described herein.

The first and second states of the occupancy volume 702 will now be described in more detail. FIG. 14A illustrates a plot of detections representative of a first state of an occupancy volume absent an object of interest. The curve designated by reference numeral 780 represents detection magnitude 781 plotted against detection range 783 for background detections of the occupancy volume (e.g., occupancy volume 702 of FIG. 13A). A portion of the curve designed by reference numeral 782 represents background detections of relatively strong magnitude at a range of about 5 meters which may be associated with an echo point (e.g., echo point may be the background object 755 of FIGS. 13A and 13B). The echo point represents an object, for example, a solid metal object that produces strong detections at the object's distance from the sensor (here, about 5 meters).

A sensor is calibrated to the first state of the occupancy volume absent an object of interest. For example, the background detections of the sensor may be processed to obtain averages of background detections at experienced detection ranges and detection magnitudes, as may be represented by curve 780. The averages may be stored in a memory and may be represented using an array of values or a linked list data structure.

In a further embodiment, the method further includes recalibrating the first sensor based upon an updated first state of the occupancy volume. For example, the first state may change based upon changes in the background objects of the occupancy volume. For example, in the security checkpoint application example above, a security officer may close the checkpoint by drawing a chain across the entry portion of occupancy volume. This may produce significant changes in the background detections, which if not recalibrated may result in differences in background detections and false indications of the presence of an object of interest.

The method may include either manually recalibrating the sensor, or automatically recalibrating the sensor at a predetermined time intervals or upon the happening of an event, such as a change in the operating environment affecting sensor sensitivity and response. In still a further embodiment, the sensor may be recalibrated if an object of interest remains for a period of time within the occupancy volume and it is desired, for example, to detect other objects of interest.

Figure 14B:
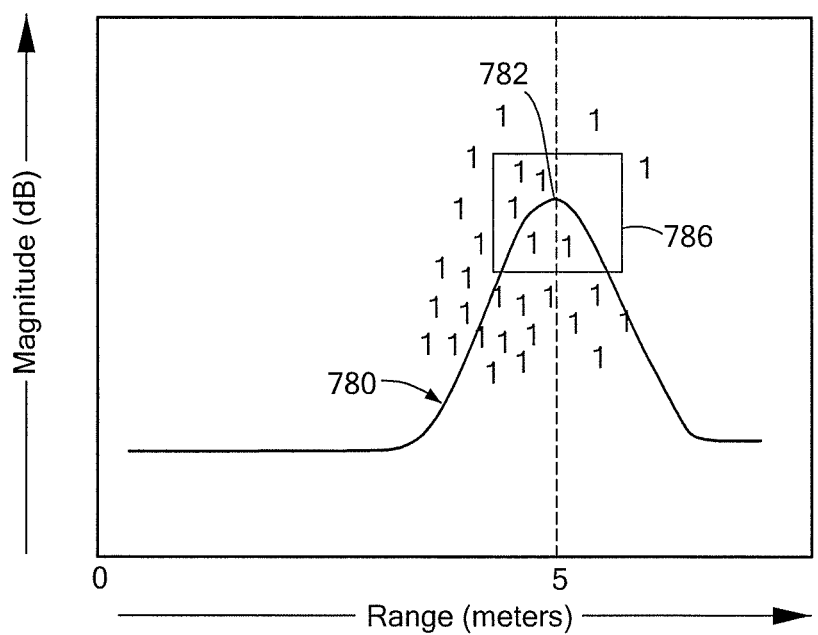

FIG. 14B, in which like elements of FIG. 14A are shown with like reference designations, illustrates a plot of detections representative of a second state of an occupancy volume having an object of interest. The detections designated by the 1s represent detections of a background object at least partially occluded from the sensor by the object of interest. As can be seen by viewing and comparing the figures, background detections 785 in FIG. 14A are generally stronger in magnitude than background detections (designated by the 1s) in FIG. 14B.

The second state of the occupancy volume is detected by identifying sensed detections weaker in magnitude than the background detections of the first state. For example, weaker detections may be processed to identify a threshold number of weaker detections in order to positively identify the object of interest.

In a further embodiment, the background detections of the first state may be further processed to identify a clutter or grouping of background detections within a range of detection magnitude and detection range, and representative of one or more background objects within the occupancy volume. For example, referring again to FIGS. 14A and 14B, echo point detections 785 may be grouped within a clutter box 786 of echo point detections having a range 786a of detection magnitude and a range 786b of detection range. Sensed detections may then be compared to the clutter box range information to identity those that fall outside of the clutter box.

Figure 15A:
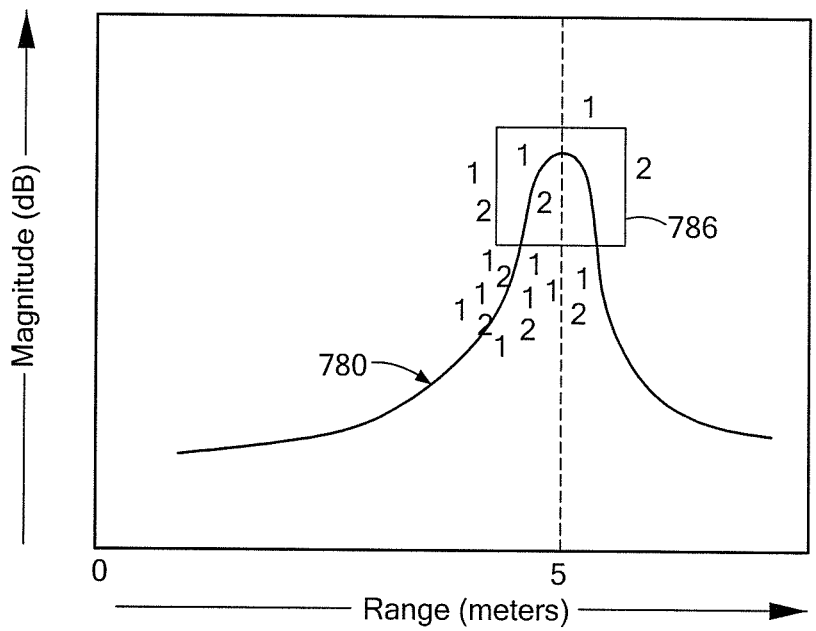
FIG. 15A shows illustrative backgrounds detections associated with a first object of interest and a second object of interest in an occupancy volume.

The inventive systems and techniques may be used to identify and distinguish between more than one object of interest passing through an occupancy volume. FIG. 15A, in which like elements to FIGS. 14A and 14B are shown with like reference designations, illustrates a plot of detections (designated by the 1s and 2s) against background detections 780. Detections designated by the 1s represent a first object of interest passing through an occupancy volume nearby by an echo point represented by clutter box 786. Further, detections designated by the 2s represent a second object of interest passing through an occupancy volume nearby the echo point. The first and second objects of interest may be quite similar, for example, mid-sized automobiles, in which case many of the corresponding detections will overlap, as they do in FIG. 15A.

Figure 15B:
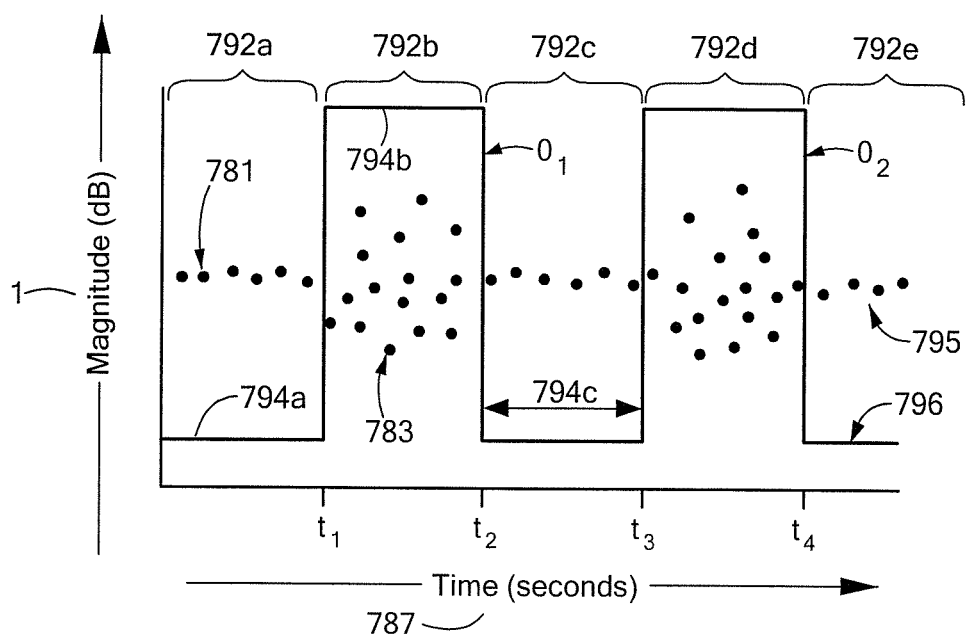
FIG. 15B shows illustrative first and second states of an occupancy volume associated with object of interest detections in FIG. 15A.

Referring now to FIG. 15B, the magnitude 781 of sensed detections 795 within an occupancy volume are plotted over time 787. The detections 795 may be subdivided over time to ascertain the different states of the occupancy volume. Time blocks 792a, 792c, and 792e represent a state of the occupancy volume during which the occupancy volume is absent an object of interest, as may be the same as first state of the occupancy volume described above with reference to FIGS. 13A and 14A. The detections (one of which is designated by reference numeral 781) in time blocks 792a, 792c, and 792e are generally constant in magnitude over time, and may represent the relatively strong detections of a background object, such as echo point 755.

Time blocks 792b and 792d represent a state of the occupancy volume during which the occupancy volume is occupied by an object of interest, as may be the same as second state of the occupancy volume described above with reference to FIGS. 13B and 14B. The detections (one of which is designated by reference numeral 783) in time blocks 792b and 792d tend to be weaker and more variant in magnitude than those of the other time blocks, since they represent background detections affected by the presence of the object of interest traversing in front of the echo point 755. For example, a curved surface of an object of interest may produce background detections which vary in magnitude as the object of interest travels through the occupancy volume.

In some instances, the time blocks may represent different objects of interest within the occupancy volume. The detections in time block 792b, for example, can represent a first object of interest as is passes into a sensor's detection range at time $T_1$, causing the occupancy volume to transition from the first state to the second state, and out of the sensor's detection range at $T_2$, causing the occupancy volume to transition from the second state to the first state.

At time $T_3$, a second object of interest passes into the sensor's detection range, causing the occupancy volume to transition from the first state to the second state, and at time $T_4$, the second object of interest passes out of the sensor's detection range, causing the occupancy volume to transition from the second state to the first state. In other instances, the detections may represent the same of object of interest, for example, as the object of interest moves in one direction through occupancy volume and moves in a second direction opposite of the first direction through the occupancy volume.

Referring again to FIG. 15B, in a further embodiment the method includes outputting an object detection state 796 representative of the state of the occupancy volume 702. For example, the first state of the occupancy volume absent an object of interest may be represented by a first binary level 794a of the output 796. Furthermore, the second state of the occupancy volume having an object of interest may be represented by a second binary level 794b of the output 796.

Still further, the output 796 may be used to distinguish between multiple objects of interest. For example a time gap 794c in output 796 may be used to distinguish a first object $O_1$ within the occupancy volume during time block 792b and a second object $O_2$ within the occupancy volume during time block 792d. The size of the time gap 794c may help distinguish whether time blocks 792b and 792d represent the same object. For example, a small time gap 794c may represent two flatbeds of a single tractor-trailer truck passing by the sensor 710 (FIGS. 13A and 13B).

Figure 16A:
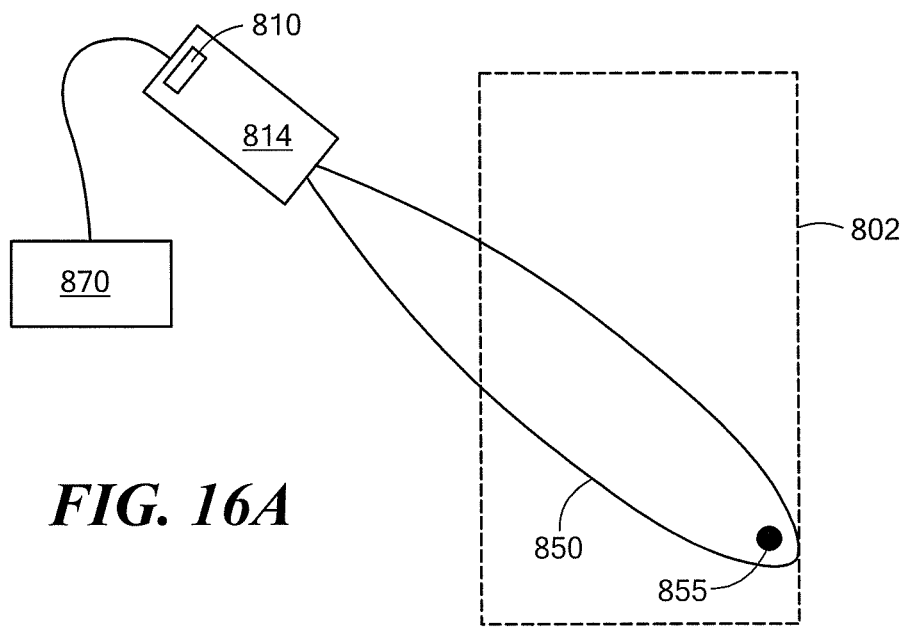
FIG. 16A is a pictorial representation of calibration of a sensor in accordance with a third state of an occupancy volume absent movement of an object of interest.
Figure 16B:
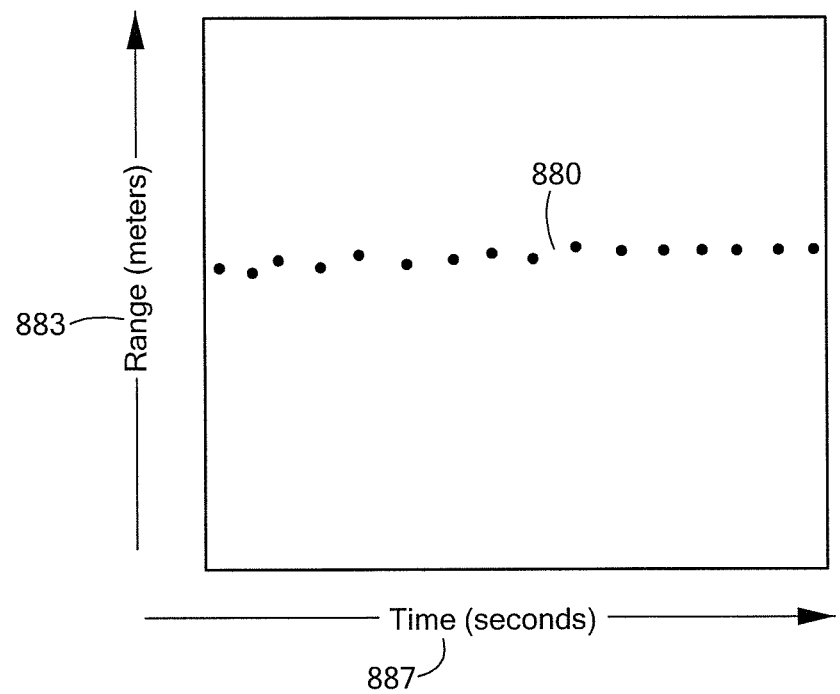
FIG. 16B shows illustrative detections associated with the third state of the occupancy volume of FIG. 16B.

Referring now to FIG. 16A, in a further embodiment the method includes calibrating a second sensor 810, as may be like sensor 630, 640, 650, or 660 of detection system 600 of FIG. 4, according a third state of an occupancy volume 802 absent movement of an object of interest. FIG. 16B illustrates a plot of detections 880 plotted over detection range 883 and detection time 887 representative of background detections 870 (FIG. 16A) of the occupancy volume 802. Such background detections 870 may represent an echo point 855 at a distance of about 5 meters from the sensor 810.

Further, the sensor 810 may be an MBR sensor producing a break-beam 850 narrowed by an absorber box 814, as may be similar to MBR sensor 420 producing break-beam 450 narrowed by absorber box 424 of FIG. 7 or MBR sensor 460 producing a break-beam narrowed by absorber box 464 of FIG. 10.

Figure 17A:
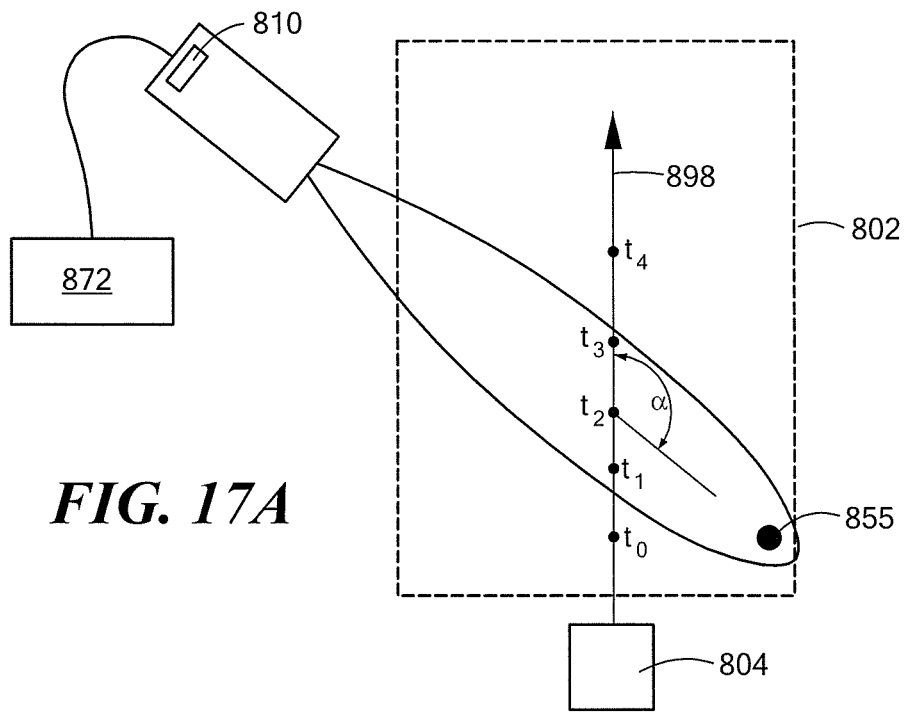
FIG. 17A is a pictorial representation of detection of movement of an object of interest in accordance with a fourth state of an occupancy volume.

Referring now to FIG. 17A, in which like elements of FIG. 16A are shown with like reference designations, the method further includes detecting a fourth state of the occupancy volume 802 having movement 898 of an object of interest 804 by identifying differences in the third state of the occupancy volume 802 and the fourth state of the occupancy volume 802. Referring now to FIG. 17B and again to FIG. 17A, detections 880 plotted as detection range 883 over detection time 887 represent background detections over time as an object of interest travels within the occupancy volume 802. The movement 898 of the object of interest 804 may be tracked over time as the object of interest passes through the sensor's 810 detection range at varying distances from the sensor 810 whose field of view may be offset at angle α from the direction of movement.

For example, at time to the third state of the occupancy volume 802 is detected since the object of interest 804 is outside of the sensor's 810 detection range and no movement is detected. At time $t_1$, the object of interest 804 passes into the sensor's 810 detection range, and the fourth state of the occupancy volume 802 is detected representing movement 898 of the object of interest 804 within the occupancy volume 802. At times t2 and t3, the object of interest 804 continues through the sensor's 810 detection range until around time $t_4$ when the object of interest 804 passes out of the sensor's 810 detection range and movement 898 is no longer detected.

It can be seen that the offset angle α of the sensor 810 with respect to the direction of movement produces varying detection ranges which may be used to determine whether the object of interest 804 is approaching or retreating from the sensor 810, and therefore the occupancy volume 802. For example, it is clear that because the detection range decreases between times $t_1$ and $t_3$, the object of interest 804 is approaching the sensor during this time period.

The offset angle α value may depend upon the needs of the application environment. For example, maximum movement sensitivity may be achieved at an offset angle α of about 180 degrees, depending on whether the sensor' field of view is coincident with the direction of movement, and the minimum movement sensitivity may be experienced at an offset angle α of about 90 degrees, at which detection range differences may be relatively small.

As described above, detection differences can be used to distinguish between the third state and the fourth state of the occupancy volume. For example, at times $t_0$ and $t_4$ the detections 880 are relatively constant in range over time, representing the calibrated detections of the third state of the occupancy volume absent movement of the object of interest 804. At times $t_1$-$t_3$, however, the detections 880 change in range over time representing the fourth state of the occupancy volume having movement of the object of interest 804.

In a further embodiment, the method includes detecting a velocity of the object of interest by obtaining a first detection range 883a and a first detection time 887a of a first detection 872a associated with the object of interest 804 and a second detection range 883b and a second detection time 887b associated with the object of interest 804 at a second detection 872b. The velocity v is obtained by calculating a ratio of the difference of the first and second detection ranges $\Delta_R$ over the difference of the first and second detection times $\Delta_t$.

Figure 17B:
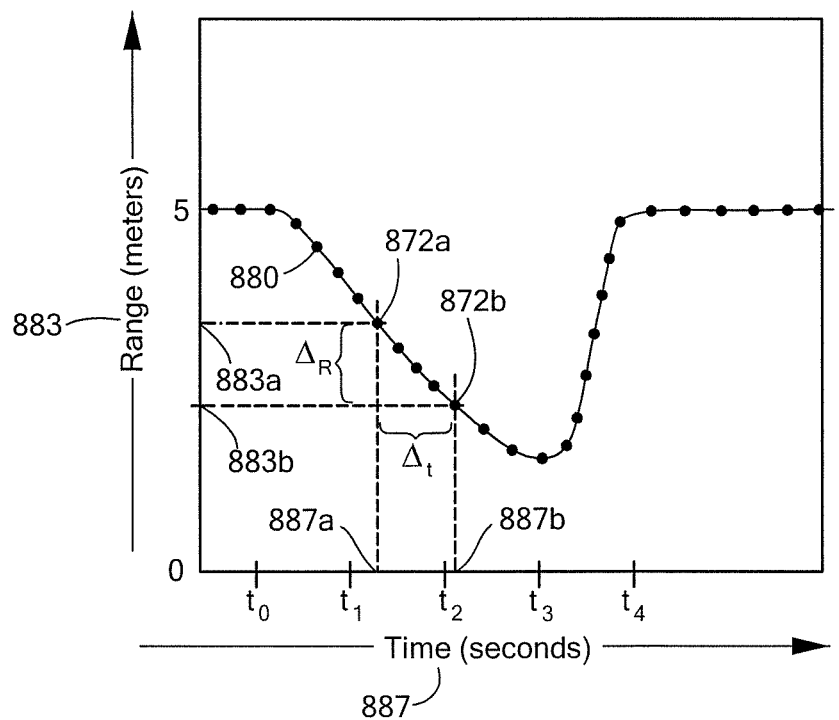
FIG. 17B shows illustrative detections representative of the fourth state of the occupancy volume of FIG. 17A.
Figure 18:
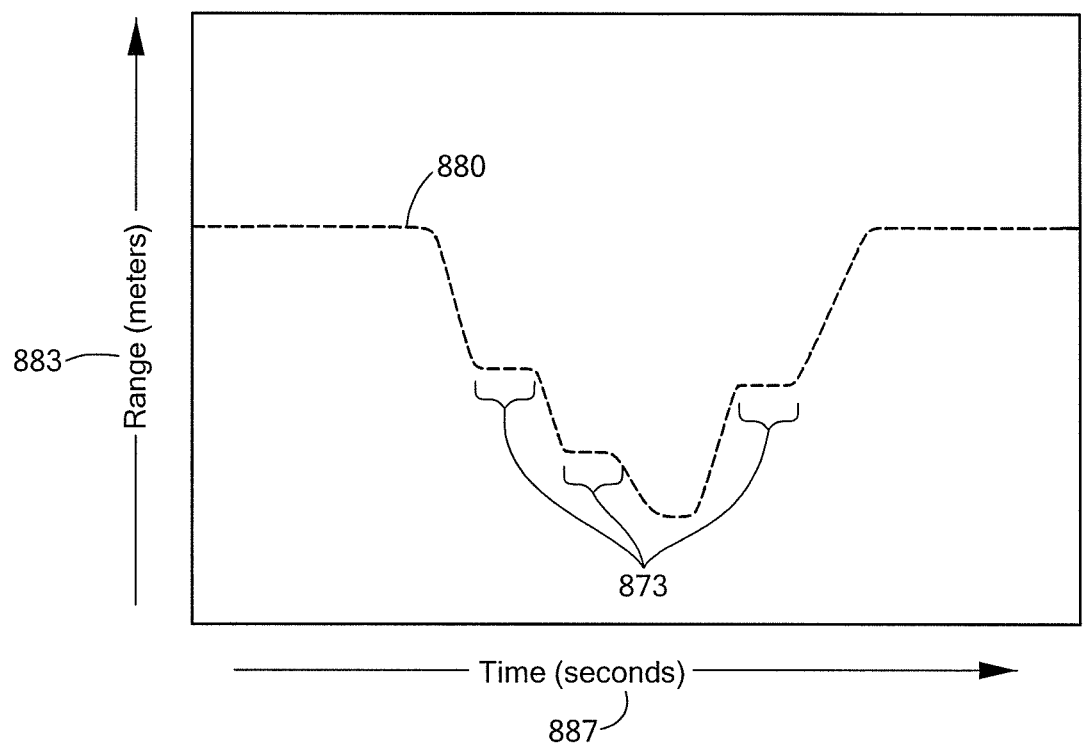
FIG. 18 shows illustrative detections representative of a stopped object of interest in accordance with the techniques and systems described herein.

In a further embodiment, the method includes identifying when the object of interest has stopped by identifying when the difference of a first and second detection range is substantially equal to 0 or by identifying when the ratio of a difference of first and second detection ranges over first and second detection times is substantially equal to 0. FIG. 18, in which like elements to FIG. 17B are shown with like reference designations, illustrates a plot of detections 880 plotted over detection range 883 and detection time 887 and obtained from a sensor. Portions of the detections 873 in which detection range differences over detection time are substantially equal to 0 can represent when an object of interest has stopped, for example, within an occupancy volume.

Figure 19A:
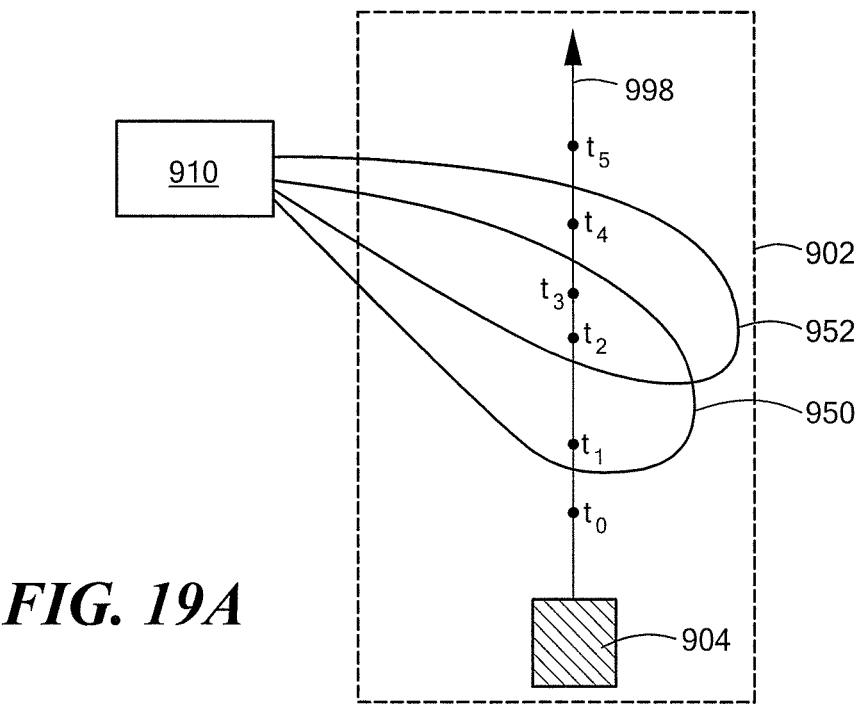
FIG. 19A is a pictorial representation of detection of movement of an object of interest using a break-bean sensor in accordance with the techniques and systems described herein.
Figure 19B:
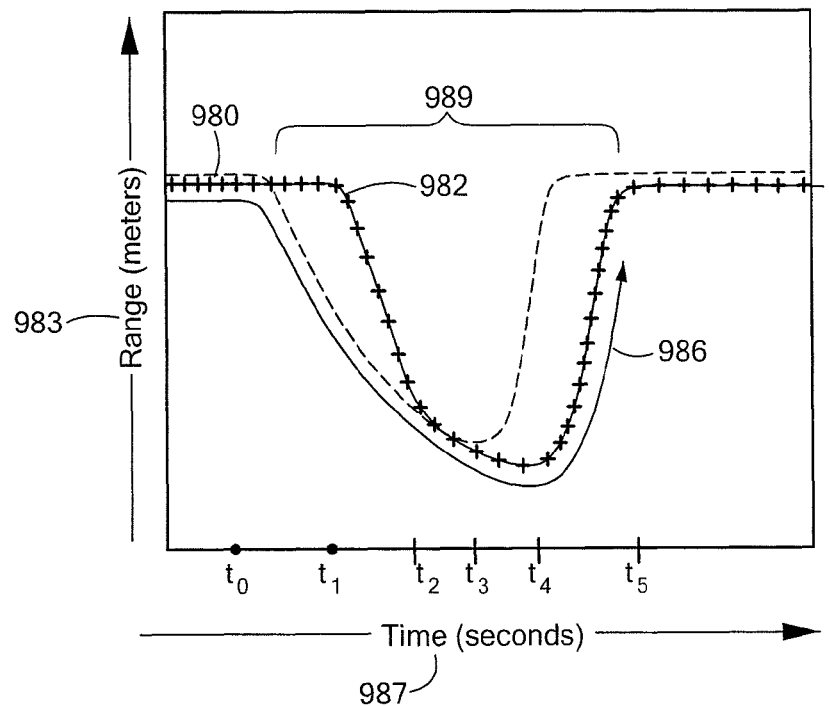
FIG. 19B shows illustrative detections of the break-beam sensor of FIG. 19A.

Referring now to FIG. 19A, in a further embodiment the method includes using multiple break-beams 950, 952 of a sensor 910 to detect movement 998 of an object of interest 904 within an occupancy volume 902. The sensor 910 provides a first break-beam 950 and a second break-beam 952, the responses of which may be compared to determine aspects of the object of interest's 904 movements 998 through the occupancy volume (e.g., the direction of movement and velocity of movement). FIG. 19B is plot of detection range 983 over detection time 987 for detections 980, 982 representative of respective responses of first and second break-beams 950, 952 of the sensor 910. At time t0, first and second break-beams do not detect the object 904. At time $t_1$, object 804 enters the detection range of the first break-beam 950, however, it is still out of range of the second break-beam 952. At times $t_2$ and $t_3$, the object 904 is detected by first and second break-beams 950, 952, and at time $t_4$ the object is out of range of the first break-beam 950, but still within range of the second break-beam 952. At time $t_5$, the object moves out of range of first and second break-beams 950, 952. The responses of the first and second break-beams 950, 952 represented by respective detections 980, 982 may be compared to more accurately determine the object's 904 direction of movement and/or velocity.

Referring again to FIG. 19B, in a further embodiment a curve 986 represents the lower range bounds of combined first and second break-beam responses 980, 982 and may be used to identify a plurality of detections 989 associated with an object of interest. For example, the plurality of detections 989 producing the valley portion of curve 986 may be processed to identify an object of interest.

Figure 20A:
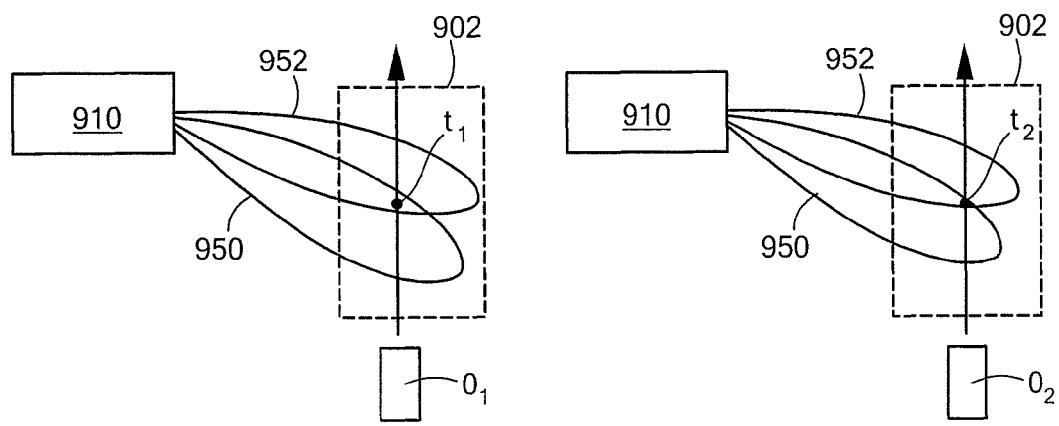
FIG. 20A is a pictorial representation of detection of movement of a first object of interest and a second object of interest using a break-bean sensor in accordance with the techniques and systems described herein.
Figure 20B:
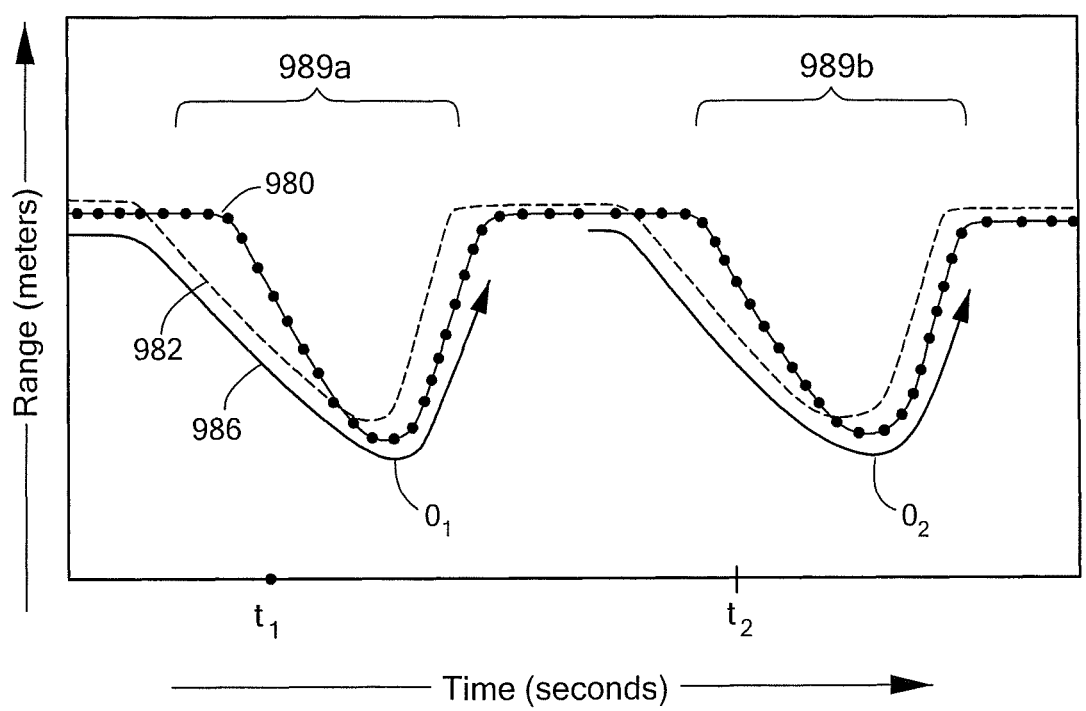
FIG. 20B shows illustrative first plurality of detections associated with the first object of interest and second plurality of detections associated with the second object of interest of FIG. 20A.

In a still a further embodiment, the method includes detecting a first object and a second object in an occupancy volume by identifying a first plurality of object movement detections associated with movement of the first object and a second plurality of object movement detection associated with movement of the second object. Referring to FIG. 20A, in which like elements of FIG. 19A are shown with like reference designations, a sensor 910 includes a first break-beam 950 and a second break-beam 952 for detecting objects of interest within an occupancy volume 902. The sensor 910 is illustrated at different times $t_1$ and $t_2$ corresponding to sensing of first object $O_1$ and second object $O_2$. Referring to FIG. 20B, in which like elements of FIG. 19B are shown with like reference designations, a first plurality of detections 989a represents first object $O_1$ as it passes through the occupancy volume at time $t_1$, and a second plurality of detections 989b represents second object $O_2$ as it passes through the occupancy volume at time $t_2$.

Figure 21:
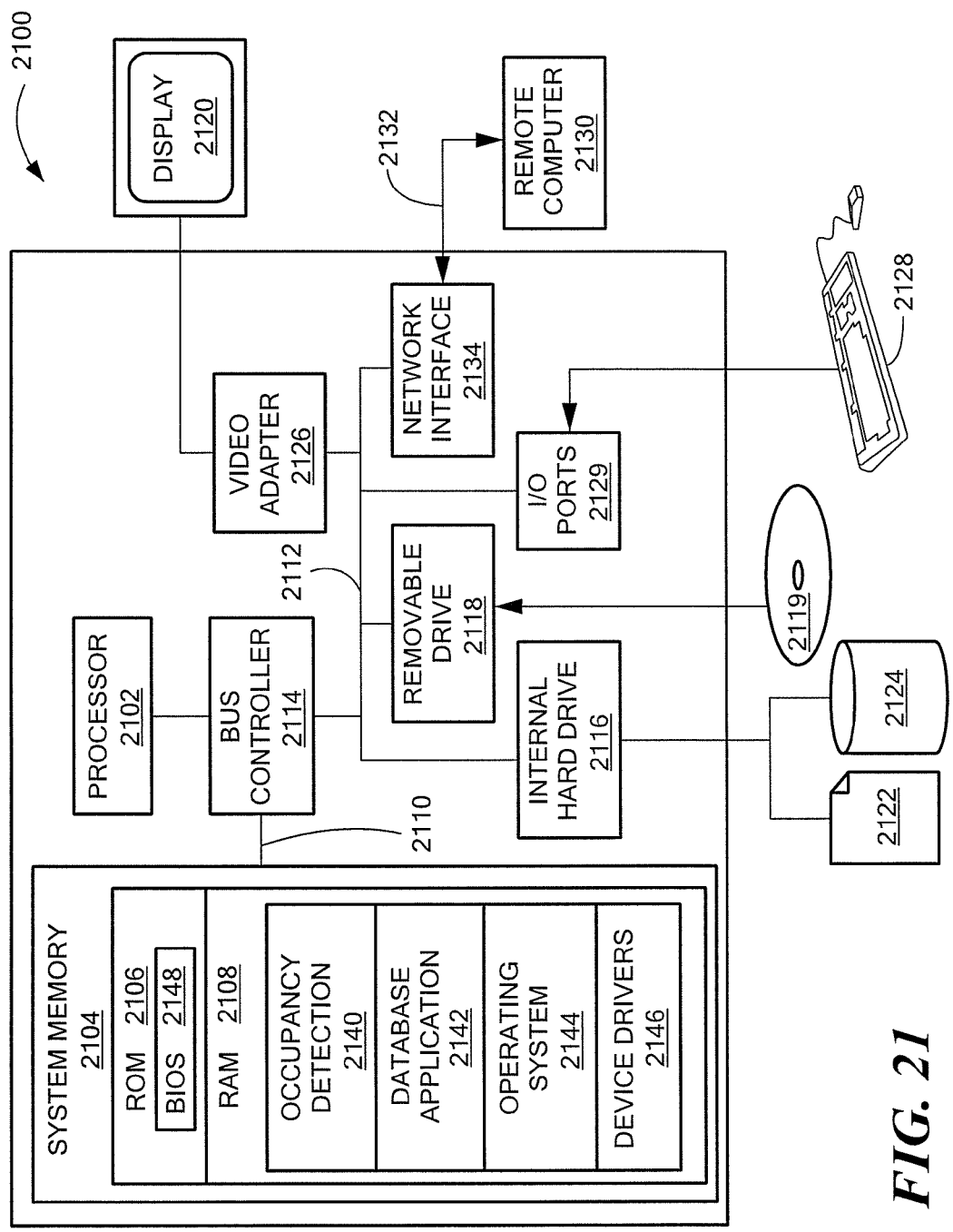
FIG. 21 is a diagram showing an exemplary hardware and operating environment of a suitable computer for use with embodiments of the invention.

FIG. 21 illustrates a computer 2100 suitable for supporting the operation of an embodiment of the inventive systems and techniques described herein. The computer 2100 includes a processor 2102, for example, a dual-core processor, such as the AMD Athlon™ X2 Dual Core processor from the Advanced Micro Devices Corporation. However, it should be understood that the computer 2100 may use other microprocessors. Computer 2100 can represent any server, personal computer, laptop, or even a battery-powered mobile device such as a hand-held personal computer, personal digital assistant, or smart phone.

Computer 2100 includes a system memory 2104 which is connected to the processor 2102 by a system data/address bus 2110. System memory 2104 includes a read-only memory (ROM) 2106 and random access memory (RAM) 2108. The ROM 2106 represents any device that is primarily read-only including electrically erasable programmable read-only memory (EEPROM), flash memory, etc. RAM 2108 represents any random access memory such as Synchronous Dynamic Random Access Memory (SDRAM). The Basic Input/Output System (BIOS) 2148 for the computer 2100 is stored in ROM 2106 and loaded into RAM 2108 upon booting.

Within the computer 2100, input/output (I/O) bus 2112 is connected to the data/address bus 2110 via a bus controller 2114. In one embodiment, the I/O bus 2112 is implemented as a Peripheral Component Interconnect (PCI) bus. The bus controller 2114 examines all signals from the processor 2102 to route signals to the appropriate bus. Signals between processor 2102 and the system memory 2104 are passed through the bus controller 2114. However, signals from the processor 2102 intended for devices other than system memory 2104 are routed to the I/O bus 2112.

Various devices are connected to the I/O bus 2112 including internal hard drive 2116 and removable storage drive 2118 such as a CD-ROM drive used to read a compact disk 2119 or a floppy drive used to read a floppy disk. The internal hard drive 2116 is used to store data, such as in files 2122 and database 2124. Database 2124 includes a structured collection of data, such as a relational database. A display 2120, such as a cathode ray tube (CRT), liquid-crystal display (LCD), etc. is connected to the I/O bus 2112 via a video adapter 2126.

A user enters commands and information into the computer 2100 by using input devices 2128, such as a keyboard and a mouse, which are connected to I/O bus 2112 via I/O ports 2129. Other types of pointing devices that may be used include track balls, joy sticks, and tracking devices suitable for positioning a cursor on a display screen of the display 2120.

Computer 2100 may include a network interface 2134 to connect to a remote computer 2130, an intranet, or the Internet via network 2132. The network 2132 may be a local area network or any other suitable communications network.

Computer-readable modules and applications 2140 and other data are typically stored on memory storage devices, which may include the internal hard drive 2116 or the compact disk 2119, and are copied to the RAM 2108 from the memory storage devices. In one embodiment, computer-readable modules and applications 2140 are stored in ROM 2106 and copied to RAM 2108 for execution, or are directly executed from ROM 2106. In still another embodiment, the computer-readable modules and applications 2140 are stored on external storage devices, for example, a hard drive of an external server computer, and delivered electronically from the external storage devices via network 2132.

The computer-readable modules 2140 may include compiled instructions for implementing the occupancy detection including calibrating of the sensors and detecting an object of interest within an occupancy volume, including whether or not the object of interest is detected and movement of the object of interest, such as direction and velocity. The computer-readable modules 2140 may include separate modules for performing occupancy detection, for example, a detection module for detecting objects of interest, a calibration module for calibrating sensors, an input module for receiving sensor data, an output module for outputting processed information and state information, and/or a display module for displaying the detection and state information. The various states of the occupancy volumes may be output to other systems, for example, scanning systems for initiating scans and security systems for initiating security measures.

The computer 2100 may execute a database application 2142, such as Oracle™ database from Oracle Corporation, to model, organize, and query data stored in database 2124. The data may be used by the computer-readable modules and applications 2140 and/or passed over the network to the remote computer 2130 and other systems.

In general, the operating system 2144 executes computer-readable modules and applications 2140 and carries out instructions issued by the user. For example, when the user wants to execute a computer-readable module 2140, the operating system 2144 interprets the instruction and causes the processor 2102 to load the computer-readable module 2140 into RAM 2108 from memory storage devices. Once the computer-readable module 2140 is loaded into RAM 2108, the processor 2102 can use the computer-readable module 2140 to carry out various instructions. The processor 2102 may also load portions of computer-readable modules and applications 2140 into RAM 2108 as needed. The operating system 2144 uses device drivers 2146 to interface with various devices, including memory storage devices, such as hard drive 2116 and removable storage drive 2118, network interface 2134, I/O ports 2129, video adapter 2126, and printers.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A detection system, comprising:
    a plurality of sensors, comprising:
        an entry sensor having a field of view oriented to detect object entry into an occupancy volume via an entry portion of the occupancy volume, object entry corresponding to a first state of the occupancy volume in which an object is present within the occupancy volume and at least a portion of a security scan of the object is performed to detect unwanted materials, wherein the entry sensor includes an absorber box to block unwanted break-beam responses and to fan sensor break-beams across different detection areas; and
        an exit sensor having a field of view oriented to detect object exit from the occupancy volume via an exit portion of the occupancy volume, object exit corresponding to a second state of the occupancy volume in which the object is absent from the occupancy volume;
        at least one approach sensor having a field of view oriented to detect object approach relative to the entry portion of the occupancy volume; and
        at least one retreat sensor having a field of view oriented to detect object retreat relative to the exit portion of the occupancy volume, wherein an occurrence of the first state of the occupancy volume followed by the second state of the occupancy volume corresponds to an occupancy volume crossed state in which the object is determined to have crossed the occupancy volume.

2. The system of claim 1, wherein the at least one approach sensor comprises:
    a first approach sensor having a first approach field of view oriented with respect to an approach volume adjacent to the entry portion and outside of the occupancy volume; and
    a second approach sensor having a second approach field of view oriented with respect the approach volume, wherein the second approach field of view is at least partially different than the first approach field of view.

3. The system of claim 2, wherein the first approach field of view is opposed to the second approach field of view to maximize object detection within the approach volume.

4. The system of claim 2, wherein the at least one retreat sensor comprises:
    a first retreat sensor having a first retreat field of view oriented with respect to a retreat volume adjacent to the exit portion and outside of the occupancy volume; and
    a second retreat sensor having a second retreat field of view oriented with respect the retreat volume, wherein the second retreat field of view is at least partially different than the first retreat field of view.

5. The system of claim 4, wherein the first retreat field of view is opposed to the second retreat field of view to maximize object detection within the retreat volume.

6. The system of claim 1, wherein at least one of the entry and exit sensors is a frequency-modulation continuous-wave microwave multi-beam radar sensor mounted within an absorber box including an inner microwave-absorbent surface to narrow beam spread of the radar sensor.

7. A detection system, comprising:
a first sensor having a first field of view oriented to detect object entry into an occupancy volume via an entry portion of the occupancy volume, object entry corresponding to a first state of the occupancy volume in which an object is present within the occupancy volume and at least a portion of a security scan of the object is performed to detect unwanted materials, wherein the first sensor includes an absorber box to block unwanted break-beam responses and to fan sensor break-beams across different detection areas;
a second sensor having a second field of view oriented to detect object exit from the occupancy volume via an exit portion of the occupancy volume, object exit corresponding to a second state of the occupancy volume in which the object is absent from the occupancy volume;
a third sensor having a third field of view oriented to detect object approach relative to the occupancy volume;
a fourth sensor having a fourth field of view oriented to detect object retreat relative to the occupancy volume, wherein an occurrence of the first state of the occupancy volume followed by the second state of the occupancy volume corresponds to an occupancy volume crossed state in which the object is determined to have crossed the occupancy volume.

8. The system of claim 7, further comprising:
a fifth sensor having a fifth field of view opposed to the third field of view of the third sensor to further detect object approach relative to the occupancy volume; and
a sixth sensor having a sixth field of view opposed to the fourth field of view of the fourth sensor to further detect object retreat relative to the occupancy volume.

9. The system of claim 8, wherein the entry portion and the exit portion of the occupancy volume are generally opposed to each other and the first sensor is positioned along the entry portion, the second sensor is positioned along the exit portion, the third and fifth sensors are positioned along the entry portion, and the fourth and sixth sensors are positioned along the exit portion.

10. The system of claim 9, wherein
the third field of view of the third sensor is oriented to detect object approach within an approach volume adjacent to the entry portion and outside of the occupancy volume, and the fifth field of view of the fifth sensor is oriented to detect object approach within the approach volume, the fifth field of view is at least partially different than the third field of view, and
the forth field of view of the fourth sensor is oriented to detect object retreat within a retreat volume adjacent to the exit portion and outside of the occupancy volume, and the sixth field of view of the sixth sensor is oriented to detect object retreat within the retreat volume, the sixth field of view is at least partially different than the forth field of view.

11. The system of claim 7, wherein the first sensor produces a first break-beam significantly reduced in longitudinal width by a first absorber box to provide object detection coverage across the entry portion of the occupancy volume, and the second sensor produces a second break-beam significantly reduced in width by a second absorber box to provide object detection coverage across the exit portion of the occupancy volume.

12. The system of claim 7, wherein the first sensor is a multi-beam radar sensor mounted within a first absorber box, and the second sensor is a multi-beam radar sensor mounted within a second absorber box, at least one of the first absorber box or second absorber box including an inner microwave-absorbent surface to narrow sensor beam spread.

13. The system of claim 7, wherein the third sensor is a multi-beam radar sensor providing a first elevation of object approach coverage relative to the ground plane of the occupancy volume coincident with ground level and the fourth sensor is a multi-beam radar sensor providing a second elevation of object retreat coverage relative to the ground plane of the occupancy volume.

14. A detection system, comprising:
a first sensor having a first field of view oriented to detect object entry into a portal zone from a lane entry zone adjacent to the portal zone at an entry portion of the portal zone, object entry corresponding to a first state of the portal zone in which an object is present within the portal zone and at least a portion of a security scan of the object is performed to detect unwanted materials, wherein the first sensor includes an absorber box to block unwanted break-beam responses and to fan sensor break-beams across different detection areas;
a second sensor having a second field of view oriented to detect object exit from the portal zone into a lane exit zone adjacent to the portal zone at an exit portion of the portal zone opposing the entry portion of the portal zone, object exit corresponding to a second state of the portal zone in which the object is absent from the portal zone;
a third sensor having a third field of view oriented to detect object approach toward the portal zone within the lane entry zone; and
a forth sensor having a forth field of view oriented to detect object retreat from the portal zone within the lane exit zone,
wherein an occurrence of the first state of the portal zone followed by the second state of the portal zone corresponds to a portal zone crossed state in which the object is determined to have crossed the portal zone.

15. The system of claim 14, wherein the portal zone is defined by a first side and a second side laterally opposing the first side, the first and second sides substantially parallel to a direction of object travel, further comprising:
a fifth sensor having a fifth field of view oriented to detect object approach toward the portal zone within the lane entry zone and laterally opposing the third field of view; and
a sixth sensor having a sixth field of view oriented to detect object retreat from the portal zone within the lane exit zone and laterally opposing the forth field of view,
wherein the first, third, and fourth sensors are substantially aligned with the first side and the second, fifth, and sixth sensors are substantially aligned with the second side.

16. The system of claim 15, further comprising:
a first vertical body positioned along the first side of the portal zone at the entry portion of the portal zone adjacent to the lane entry zone; and
a second vertical body positioned along the second side of the portal zone at the exit portion of the portal zone adjacent to the lane exit zone,
wherein the first, third, and forth sensors are mounted to the first vertical body and the second, fifth, and sixth sensors are mounted to the second vertical body.

17. The system of claim 16, wherein the first sensor is mounted within a first absorber box to reduce the longitudinal width of the first field of view, the second sensor is mounted within a second absorber box to reduce the longitudinal width of the second field of view, the third sensor is mounted within a third absorber box to further reduce the third field of view and the fourth sensor is mounted within a fourth absorber box to further reduce the fourth field of view and the fifth sensor is mounted within a fifth absorber box to further reduce the fifth field of view and the sixth sensor is mounted within a sixth absorber box to further reduce the fifth field of view.

18. The system of claim 17, wherein the third field of view is further oriented toward ground level at one side of the late entry zone and the fifth field of view is further oriented toward ground level at another side of the late entry zone opposing the one side of the late entry zone, and the forth field of view is further oriented toward ground level at one side of the late exit zone and the sixth field of view is further oriented toward ground level at another side of the late exit zone opposing the one side of the lane exit zone.

19. The detection system of claim 1, wherein the occupancy volume has a predetermined width, a predetermined height, and a predetermined depth defining a crossing zone between a first area and a second area.

20. The detection system of claim 19, wherein the first area corresponds to a first country, the second area corresponds to a second country, and the crossing zone corresponds to a border between the first country and the second country.

21. The detection system of claim 19, wherein crossing zone corresponds to a security zone about a building or a facility and one of the first or second areas corresponds to a secured area.

22. The detection system of claim 1, wherein the field of view of the entry sensor and the field of view of the exit sensor combine to form a gap-less sensor area that fills the occupancy volume.

23. The detection system of claim 1, wherein the occupancy volume is a box shaped volume defining a crossing area, the entry portion is defined along an entry side of the crossing area and the exit portion is defined along an exit side of the crossing area opposing the entry side of the crossing area.

24. The detection system of claim 1, wherein object approach relative to the entry portion of the occupancy volume corresponds to a third state of the occupancy volume to alert of an approach of the object relative to the occupancy volume and object retreat relative to the exit portion of the occupancy volume corresponds to a fourth state of the occupancy volume in which preparations for a scan of another object are performed.

25. The detection system of claim 1, wherein the occupancy volume corresponds to a security checkpoint and the security scan of the first state of the occupancy volume enables a determination as to whether the object may cross the security checkpoint and the occurrence of the occupancy volume crossed state enables a determination that the object is allowed to cross the security checkpoint based on the results of the security scan.

* * * * *